(12) United States Patent
Maeda et al.

(10) Patent No.: US 7,783,042 B2
(45) Date of Patent: Aug. 24, 2010

(54) COMMUNICATION SYSTEM AND SYNCHRONIZATION METHOD THEREOF

(75) Inventors: Wakako Maeda, Tokyo (JP); Shuji Suzuki, Tokyo (JP); Akio Tajima, Tokyo (JP); Seigo Takahashi, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1566 days.

(21) Appl. No.: 11/056,183

(22) Filed: Feb. 14, 2005

(65) Prior Publication Data

US 2005/0180575 A1   Aug. 18, 2005

(30) Foreign Application Priority Data

Feb. 13, 2004 (JP) ............................ 2004-036142
Nov. 22, 2004 (JP) ............................ 2004-336955

(51) Int. Cl.
*H04L 9/00* (2006.01)
*H04L 9/08* (2006.01)
*H04B 17/00* (2006.01)
*H03L 7/197* (2006.01)
*H01Q 3/26* (2006.01)

(52) U.S. Cl. ................. 380/277; 380/278; 380/280; 455/67.11

(58) Field of Classification Search ................. 380/278
See application file for complete search history.

(56) References Cited

U.S. PATENT DOCUMENTS

2006/0204170 A1* 9/2006 Igarashi et al. ................. 385/24

FOREIGN PATENT DOCUMENTS

| | | | |
|---|---|---|---|
| GB | 2313236 A | * 11/1997 | |
| JP | 63-107323 A | 5/1988 | |
| JP | 2-142231 A | 5/1990 | |
| JP | 8-505019 A | 5/1996 | |
| JP | 8-340320 A | 12/1996 | |
| JP | 2003-37594 A | 2/2003 | |

(Continued)

OTHER PUBLICATIONS

Sauge, S.; Swillo, M.; Albert-Seifried, S.; Xavier, G.B.; Waldeback, J.; Tengner, M.; Ljunggren, D.; Wang, Q.; Karlsson, A.; "Quantum Communication in Optical Networks: an Overview and Selected Recent Results" Transparent Optical Networks, 2007. ICTON '07. 9th International Conference on vol. 1, Mar. 2007, pp. 30-33.*

(Continued)

*Primary Examiner*—Matthew B Smithers
*Assistant Examiner*—Courtney D Fields
(74) *Attorney, Agent, or Firm*—Sughrue Mion, PLLC

(57) ABSTRACT

A clock signal of a master clock of a sender is transmitted to a receiver through a classical channel and is returned from the receiver. The clock signal is transmitted with strong light from a sender-side quantum unit to a receiver-side quantum unit through a quantum channel. A sender-side synchronization section establishes phase synchronization between the clock signal returned from the receiver and the clock signal detected by the sender-side quantum unit, and generates a calibration clock signal. At the receiver as well, a receiver-side synchronization section establishes phase synchronization between the clock signal detected from the classical channel and the clock signal detected by the receiver-side quantum unit, and generates a calibration clock signal.

27 Claims, 11 Drawing Sheets

FOREIGN PATENT DOCUMENTS

WO    WO 94/15422 A1    7/1994

OTHER PUBLICATIONS

G. Ribordy, J.D. Gautier, N. Gisin, O. Guinnard, and H. Zbinden "Automated 'plug & play' quantum key distribution" Electronics Letters. vol. 34, No. 22 (Oct. 29, 1998), pp. 2116-2117.

A. Muller, T. Herzog. B. Huttner, W. Tittel, H. Zbinden, and N. Gisin " 'Plug & Play' systems for quantum cryptography" Applied Physics Letters, vol. 70, No. 7 (Feb. 17, 1997), pp. 793 to 795.

H. Zbinden, J.D. Gautier, N. Gisin. B. Huttner. A. Muller, and W. Tittel "Interferometry with Faraday mirrors for quantum cryptography" Electronics Letters. vol. 33. No. 7 (Mar. 27, 1997), pp. 586 to 588.).

* cited by examiner

COMMUNICATION SYSTEM AND SYNCHRONIZATION METHOD THEREOF

BACKGROUND OF THE INVENTION

1. Field of the Invention

The present invention relates to a communication system using communication channels, one of which transmits a signal in a state where its optical power is relatively small, and the other of which transmits a signal in a normal state where the optical power is relatively large. In particular, the present invention relates to a method of establishing synchronization between communicating devices in the communication system.

2. Description of the Related Art

In the field of quantum cryptography, it is known, based on Heisenberg's uncertainty principle, that eavesdropping between a sender and a receiver can be detected with high probability. In other words, this fact allows the sender and receiver to share a secret bit string (cryptographic key) without being eavesdropped. As an example of a procedure to share the secret information, BB84 (Bennett Brassard 84) protocol using four quantum states is known. A high level of security can be achieved by using a bit string created through this procedure as a key of Vernam cipher, which has been proved to be perfectly secure. The key-sharing procedure according to the BB84 protocol will be described briefly.

FIG. 1 is a schematic diagram for explaining a key-sharing procedure, steps 1 to 8, according to the BB84 protocol. The key-sharing procedure is as follows:

Step 1) a sender creates phase-modulating data based on random data bits, which are source data of a cryptographic key, and on random data, which is base information A ("+" base or "×" base) to be used at modulation. The sender stores the phase-modulating data;

Step 2) the sender modulates the phase of an optical pulse based on the phase-modulating data and sends the phase-modulated optical pulse to a receiver through a quantum channel;

Step 3) the receiver receives the optical pulse from the sender via an interferometer while also modulating the phase of the received optical pulse based on random base data ("+" base or "×" base);

Step 4) the receiver stores data bits that the receiver could optically receive through the interferometer, that is a detected output, and base information B used at the detected output. The receiver sends the base information B to the sender through a classical channel;

Step 5) the sender compares the base information B received from the receiver with the base information A stored. From the random data bits that are the source data, the sender discards bits whose corresponding bases in the base information A do not match the corresponding bases in the base information B;

Step 6) the sender sends the bit numbers of the remaining bits, which have not been discarded, to the receiver through the classical channel;

Step 7) the receiver discards the detected data bits with bit numbers other than the bit numbers received from the sender; and Step 8) the data bits that remain in the end are made cryptographic key data to be shared between the sender and the receiver.

There have been proposed some quantum key distribution systems employing such a key-sharing scheme. In particular, "Plug & Play" schemes proposed by groups at the University of Geneva, Switzerland, are supposed to be promising schemes to bring into practical use a quantum key distribution system, which is sensitive to polarization, because the "Plug & Play" schemes can compensate a polarization drift occurring over an optical fiber transmission line. (See the followings:

G. Ribordy, J. D. Gautier, N. Gisin, O. Guinnard, and H. Zbinden "Automated 'plug & play' quantum key distribution" ELECTRONICS LETTERS, Vol. 34, No. 22 (Oct. 29, 1998), pp. 2116 to 2117;

A. Muller, T. Herzog, B. Huttner, W. Tittel, H. Zbinden, and N. Gisin "'Plug & Play' systems for quantum cryptography" Applied Physics Letters, Vol. 70, No. 7 (Feb. 17, 1997), pp. 793 to 795; and H. Zbinden, J. D. Gautier, N. Gisin, S. Huttner, A. Muller, and W. Tittel "Interferometry with Faraday mirrors for quantum cryptography" ELECTRONICS LETTERS, Vol. 33, No. 7 (Mar. 27, 1997), pp. 586 to 588.)

A general configuration of a "Plug & Play" system is shown in FIG. 2.

As shown in FIG. 2, at a receiver (traditionally referred to as "Bob") which is to receive a quantum cryptographic key in the "Plug & Play" system, an optical pulse P is first generated by a laser LD and then split into two pulses. One of the pulses, an optical pulse P1, is allowed to go along a short path, and the other, an optical pulse P2, is allowed to go along a long path, whereby the two pulses are sent to a sender (traditionally referred to as "Alice") sequentially with a small time delay between them. Upon receiving the optical pulses P1 and P2 sequentially, Alice allows the optical pulse P1 to be reflected by Faraday mirrors to make its polarization state rotate by 90 degrees and sends the optical pulse P1 back to Bob. Moreover, Alice similarly allows the optical pulse P2 to be reflected by the Faraday mirrors while modulating the phase of the optical pulse P2. Then, Alice sends a phase-modulated optical pulse $P2^{*A}$ back to Bob.

Bob allows the optical pulse P1 received from Alice to pass along the long path, which is a different path from the path used when the optical pulse P1 was sent out. At the same time, Bob modulates the phase of the optical pulse P1 to obtain a phase-modulated optical pulse $P1^{*B}$. Meanwhile, the optical pulse $P2^{*A}$, which has been phase-modulated on the Alice's side, is allowed through the short path, which is a different path from the path used when it (i.e., the optical pulse P2) was sent out. Thereafter, the optical pulse $P2^{*A}$ is made to interfere with the optical pulse $P1^{*B}$, which has been phase-modulated on the Bob's side. The result thereof is detected by an optical detector APD1 or APD2. As a whole, the optical pulses P1 and P2, obtained by splitting an optical pulse into two on the Bob's side, follow the same optical path and then interfere with each other. Accordingly, since variations in delay due to the optical fiber transmission line cancel out, the result of the interference observed by the optical detector depends on a difference between the phase modulation on the Alice's side and the phase modulation on the Bob's side.

The "Plug & Play" system having such a configuration requires synchronization as described below:

1) at the sender (Alice), to modulate the optical pulse P2 received from the receiver (Bob), the optical pulse P2 should be made to follow the variations in delay due to the optical fiber transmission line;

2) at the receiver, to modulate the optical pulse P1 reflected from the sender, the optical pulse P1 should be made to follow the variations in delay due to the optical fiber transmission line; and 3) at the receiver, when any of the optical pulses is received, a bias to apply to the optical detector should be applied in accordance with the received optical pulse (ultra-high-sensitivity reception in Geiger mode).

Moreover, in quantum key distribution systems, it is also required to establish the synchronization of bit positions for basic information exchanges and for a key creation sequence.

In the quantum key distribution systems, however, unlike a conventional optical communications system, the optical power is very small, at a single photon level at most. Therefore, it is impossible to perform, using a quantum channel, clock extraction as in a conventional case of using a classical channel. In the present disclosure, a quantum channel is defined as a communication channel in a state where the optical power of transmission from a sender to a receiver is very weak, with at most one photon per bit, whereas a classical channel is defined as a communication channel that is in a normal optical power range.

Specifically, when communications are performed using a quantum channel with light at a very low optical power level, the light hardly reaches an optical detector APD. Therefore, for example, even if a sender sends data with a mark ratio of 1/2, the mark ratio becomes far smaller than 1/2 at a receiver. Accordingly, data losses occur, and an accurate-period clock signal cannot be extracted. A classical channel is therefore normally used to provide synchronization for such a quantum channel.

For example, Japanese Unexamined Application Publication No. H08-505019 discloses a method to provide bit synchronization and other system calibration using a classical channel. According to this method, both the quantum channel and classical channel are installed in the same transmission line, and the classical channel is used to provide clock synchronization for the quantum channel where the optical power is very weak.

Further, Japanese Unexamined Application Publication No. S63-107323 discloses an optical transmission system in which variations in the transmission characteristics of an optical fiber are detected on the receiver side, thereby making it possible to compensate the characteristic variations. Specifically, a reference signal, which has a different wavelength from that of a data signal, is sent from a receiver to a sender and returned by the sender to the receiver. From this returned reference signal, variations in the transmission characteristics of the optical fiber are detected.

However, in practice, there is wavelength dispersion in an optical transmission line. As described in Japanese Unexamined Application Publication No. H08-505019, even in the same transmission line, the propagation times over the quantum channel and the classical channel are different from each other because of the different wavelengths used in the quantum channel and the classical channel. Accordingly, the phase relationship between signals over the quantum channel and over the classical channel becomes out of phase, and it is therefore impossible to establish the clock synchronization over the quantum channel and the bit synchronization for key creation. If the quantum channel and the classical channel are individually formed of separate transmission lines, a setup is needed for each of the transmission lines because the propagation time depends on the characteristics (propagation length, dispersion, etc.) of the individual transmission line. In any case, the phase relationship between signals over the quantum channel and over the classical channel is out of phase, and it is therefore impossible to establish the clock synchronization over the quantum channel and the bit synchronization for key creation.

In addition, also in the optical transmission system disclosed in Japanese Unexamined Application Publication No. S63-107323, the different-wavelength reference signal is transmitted to compensate fluctuations of an optical signal. Therefore, from a similar reason, it is impossible to extract a clock signal from the quantum channel and to transmit with accuracy a reference signal for providing key creation synchronization, that is, for providing the synchronization of bit positions.

SUMMARY OF THE INVENTION

Accordingly, it is an object of the present invention to provide a system and a method for establishing synchronization over channels including a channel which is capable of accurate clock extraction and another channel which is incapable of accurate clock extraction, between a sender and a receiver connected to each other through the channels.

A communication system according to the present invention includes first and second communication devices which are connected to each other through at least one transmission line including first and second channels through which a signal in a state where optical power is relatively small and a signal in a normal state where optical power is relatively large are transmitted. At least one of the communication devices is provided with a reference signal generator which generates a reference signal to be transmitted through the second channel, and each of the communication devices is provided with a communicating section which transmits the reference signal from its own communication device to the other communication device through the first channel, in the normal state where the optical power is relatively large. Further, each of the communication devices has a phase comparator which compares a phase of the reference signal detected from the first channel with a phase of the reference signal detected from the second channel, and a synchronization establishing section which establishes synchronization between the first and second communication devices, based on a result of comparison made by the phase comparator.

According to a first embodiment of the present invention, the reference signal is a clock signal, and the synchronization establishing section adjusts timing so that the clock signal detected from the first channel and the clock signal detected from the second channel will be in phase with each other.

According to a second embodiment of the present invention, the reference signal is a shared-information creation reference signal (key creation reference signal) for creating information to be shared between the first and second communication devices, and the synchronization establishing section adjusts timing so that the shared-information creation reference signal detected from the first channel and the shared-information creation reference signal detected from the second channel will be in phase with each other.

According to one example of the present invention, the communication system further has a communication controller which sets the communicating section in a communication mode corresponding the normal state where the optical power is relatively large, during synchronization establishing operation, and which switches the communicating section into a communication mode corresponding to the state where the optical power is relatively small, after the synchronization has been established.

A method of establishing synchronization between first and second communication devices according to the present invention includes the steps of: setting the first and second communication devices in a training mode; transmitting a clock signal from the first communication device to the second communication device through first and second channels respectively, each in a normal state where optical power is relatively large; comparing a phase of the clock signal detected from the first channel with a phase of the clock signal detected from the second channel; and generating a calibration clock signal that provides synchronization between the first and second communication devices, by bringing the detected clock signals in phase with each other.

More preferably, in accordance with the calibration clock signal, a shared-information creation reference signal for creating information to be shared between the first and second communicating devices is transmitted from the first communication device to the second communication device through the first and second channels respectively, each in the normal state where the optical power is relatively large. In accordance with the calibration clock signal, a phase of the shared-information creation reference signal detected from the first channel is compared with a phase of the shared-information creation reference signal detected from the second channel. Based on a phase difference between the detected shared-information creation reference signals, synchronization for creating the information to be shared between the first and second communication devices is established.

Preferably, the present invention can apply to a quantum key distribution system. Specifically, in a quantum key distribution system, a sender including a sender-side quantum unit and a receiver including a receiver-side quantum unit are connected to each other through a transmission line including a quantum channel and a classical channel, the quantum channel being a communication channel in a state where the optical power of the transmission from the sender-side quantum unit to the receiver-side quantum unit is very weak, and the classical channel being a communication channel in a normal state where the optical power is larger than in the state where the optical power is very weak. The quantum key distribution system has: an instructor which instructs the sender-side and receiver-side quantum units to fall in a training mode in which communications over the quantum channel are performed with the optical power in the normal state; a communicating section which is provided to the sender-side quantum unit, and which performs communication in the training mode by bringing the optical power into the normal state; and a synchronization establishing section which is provided to each of the sender-side and receiver-side quantum units, and which compares a phase of a clock signal extracted from the quantum channel with a phase of a clock signal extracted from the classical channel, the clock signals extracted in the training mode, and thereby establishes clock synchronization between the sender-side and receiver-side quantum units.

Further, key creation synchronization can be achieved in the following manner: transmitting key creation reference signals from the sender-side quantum unit to the receiver-side quantum unit through the quantum channel and the classical channel respectively; in the receiver-side quantum unit, detecting a phase difference between the key creation reference signal received through the quantum channel and the key creation reference signal received through the classical channel; and compensating the detected phase difference.

A method for synchronization of a quantum key distribution system according the present invention includes the steps of: instructing sender-side and receiver-side quantum units to fall in a training mode in which communications over a quantum channel are performed with optical power in the normal state; in the sender-side quantum unit, performing communication in the training mode by bringing the optical power into the normal state; and, in the receiver-side quantum unit, comparing a phase of a clock signal extracted from the quantum channel with a phase of a clock signal extracted from a classical channel, the clock signals extracted in the training mode, thereby establishing clock synchronization between the sender-side and receiver-side quantum units.

Further, key creation synchronization is achieved in the following manner: transmitting key creation reference signals from the sender-side quantum unit to the receiver-side quantum unit through the quantum channel and the classical channel respectively; in the receiver-side quantum unit, detecting a phase difference between the key creation reference signal received through the quantum channel and the key creation reference signal received through the classical channel; and compensating the detected phase difference.

According to the present invention, a propagation delay difference, due to wavelength dispersion and the like, between the first channel in the very weak communication state and the second channel in the normal communication state can be calibrated automatically, independently of the transmission line. This brings about such an effect that synchronization between the sender and the receiver can be established by using the second channel, instead of using the first channel that is incapable of clock extraction and accurate reference signal transmission.

In the case where the present invention is applied to a quantum key distribution system, clock synchronization can be established in the following manner: before starting key creation, setting a mode in which communications over the quantum channel are performed with strong light at a normal optical power level (hereinafter, this mode will be referred to as a training mode); comparing a phase of a clock signal extracted from the quantum channel with a phase of a clock signal extracted from the classical channel, the clock signals extracted in the training mode; and automatically calibrating a propagation delay difference, due to wavelength dispersion and the like, between the quantum channel and the classical channel.

Further, key creation synchronization can be achieved in the following manner: transmitting key creation reference signals from the sender-side quantum unit to the receiver-side quantum unit through the quantum channel and the classical channel respectively; detecting a phase difference between the key creation reference signals received through the respective channels; and correcting the phase difference.

As described above, according to the present invention, the training mode in which communications are performed with strong light at a normal optical power level, is set before key creation is started. A difference in propagation delay from a different-wavelength synchronization signal, due to wavelength dispersion, is calibrated. Then, during the key creation, clock synchronization and key creation synchronization are provided using the different-wavelength synchronization signal. This makes it possible to automatically calibrate a propagation delay difference due to wavelength dispersion between the quantum channel and the classical channel, independently of the transmission line. Consequently, it will be possible to establish synchronization between the sender and the receiver by using the classical channel at a difference wavelength from that of the quantum channel, instead of using the quantum channel that is incapable of clock extraction and accurate reference signal transmission because of the very weak light.

DETAILED DESCRIPTION OF THE PREFERRED EMBODIMENTS

Hereinafter, embodiments of the present invention will be described in detail. For the purpose of simplicity, description will be given, as examples, of communication systems in which two communicating devices are connected to each other through optical fiber.

1. First Embodiment

Figure 3:
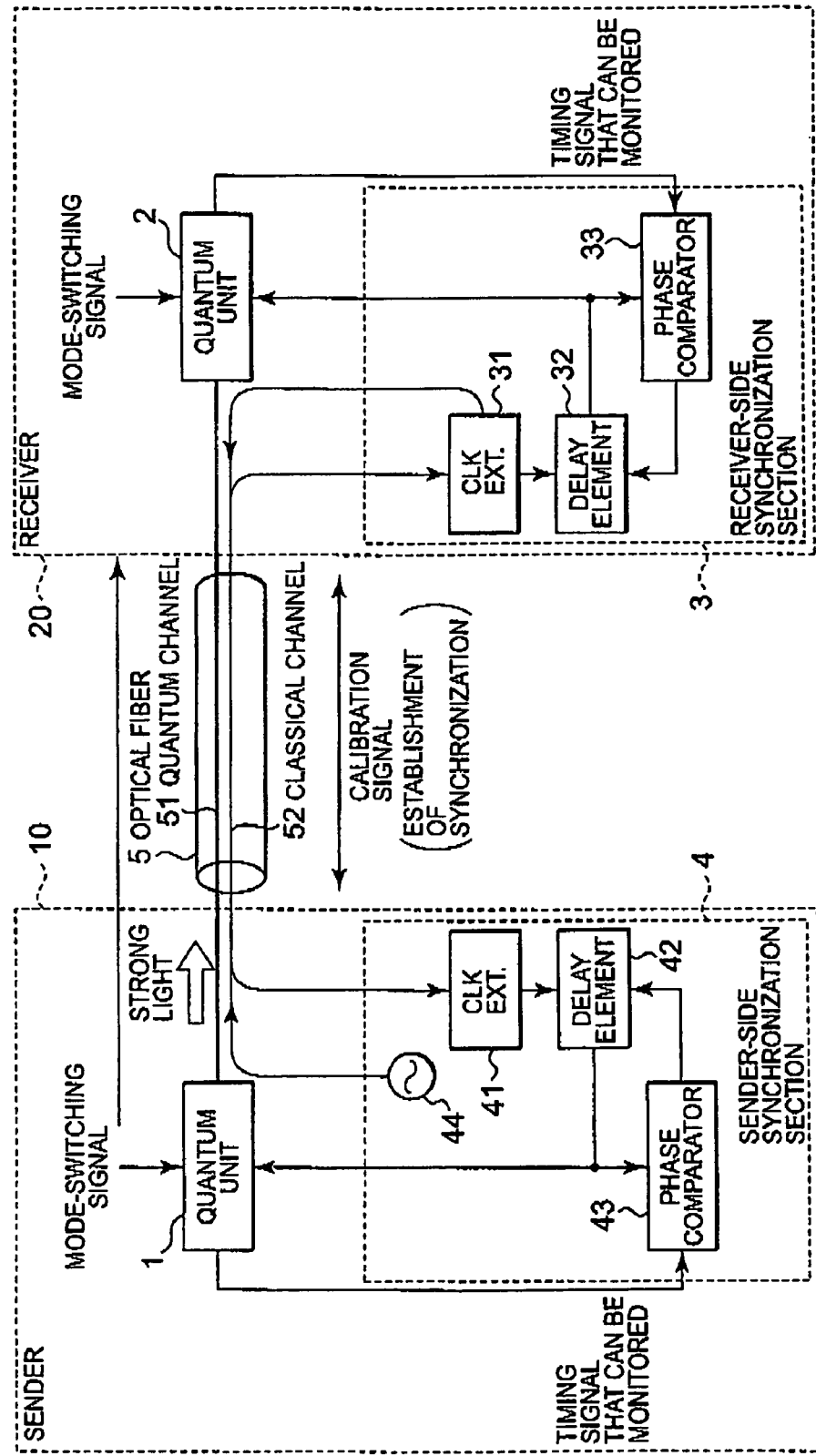
FIG. 3 is a block diagram showing a general configuration of a communications system according to a first embodiment of the present invention.

FIG. 3 is a block diagram showing a general configuration of a communication system according to a first embodiment of the present invention. In this system, a sender 10 and a receiver 20 are connected to each other through an optical fiber transmission line 5, which includes a quantum channel 51 and a classical channel 52. The quantum channel 51 and the classical channel 52 are different wavelength channels on the same transmission line (optical fiber transmission line 5).

The sender 10 includes a quantum unit 1 and a synchronization section 4. The receiver 20 includes a quantum unit 2 and a synchronization section 3. The quantum units 1 and 2 create a cryptographic key, called a raw key, through the quantum channel 51. As will be described later, the sender 10 and the receiver 20 establish synchronization between the quantum units 1 and 2 using the quantum channel 51 and the classical channel 52, which are different wavelength channels.

The synchronization section 3 of the receiver 20 has a clock extractor 31, a delay element 32 and a phase comparator 33. As will be described later, in the delay element 32, the amount of delay is controlled depending on a result of comparison made by the phase comparator 33. The synchronization section 4 of the sender 10 has a clock extractor 41, a delay element 42, a phase comparator 43, and a master clock 44. As will be described later, in the delay element 42, the amount of delay is controlled depending on a result of comparison made by the phase comparator 43. In addition, a communication controller (not shown) is provided for each of the sender 10 and the receiver 20.

Each of the quantum unit 1 and the quantum unit 2 shifts to a training mode when receiving a mode-switching signal for switching to the training mode from its corresponding communication controller. In the training mode, an optical signal at approximately the same optical power level as over the classical channel is transmitted over the quantum channel 51, whereby it becomes possible for each of the quantum units 1 and 2 to extract a clock signal.

First, the master clock 44 transmits a clock signal to the receiver 20 through the classical channel 52. The clock extractor 31 in the synchronization section 3 of the receiver 20 extracts the clock signal from a signal received through the classical channel 52, and sends the clock signal, as it is, back over the classical channel 52.

The clock extractor 41 in the synchronization section 4 of the sender 10 extracts the clock signal that has been sent back from the receiver 20 through the classical channel 52. The extracted clock signal is delayed by the delay element 42 and then outputted to each of the phase comparator 43 and the quantum unit 1. When a mode signal for switching to the training mode is inputted, the quantum unit 1 of the sender 10 transmits over the quantum channel 51 as strong light as used in normal communication, in accordance with the clock signal inputted from the delay element 42. The phase comparator 43 compares the phase of the clock signal of the quantum channel 51, which is monitored by the quantum unit 1, with the phase of the clock signal of the classical channel 52, which is inputted from the delay element 42. The phase comparator 43 controls the amount of delay in the delay element 42 so that a phase deviation detected by the comparison is compensated. That is, the phase comparator 43 and the delay element 42 constitute a delay lock loop (DLL).

The quantum unit 2 of the receiver 20 extracts a clock signal from a signal received through the quantum channel 51 and outputs the clock signal to the phase comparator 33. Meanwhile, the clock signal extracted by the clock extractor 31 in the synchronization section 3 of the receiver 20 is delayed in the delay element 32 and then outputted to each of the phase comparator 33 and the quantum unit 2. The phase comparator 33 compares the phase of the clock signal of the quantum channel 51, which is monitored by the quantum unit 2, with the phase of the clock signal of the classical channel 52, which is inputted from the delay element 32. The phase comparator 33 controls the amount of delay in the delay element 32 so that a phase deviation detected by the comparison is compensated. That is, the phase comparator 33 and the delay element 32 constitute a delay lock loop (DLL).

Thus, the amounts of delay are adjusted at the sender 10 and the receiver 20, whereby synchronization on the basis of the master clock 44 is established. Once the synchronization is established, the quantum unit 1 of the sender 10 and the quantum unit 2 of the receiver 20 can perform given operations in accordance with the respective clock signals that are synchronized with each other.

Incidentally, when switching into the training mode or a quantum mode, the sender 10 and the receiver 20 exchange a switching request and related responses through the classical channel 52, whereby they notify each other to switch into any of the modes. Each of the respective communication controllers of the sender 10 and the receiver 20 outputs a mode switching signal for switching to training mode or quantum mode, depending on this switching notification.

1.1) FIRST EXAMPLE

Configuration

Figure 2:
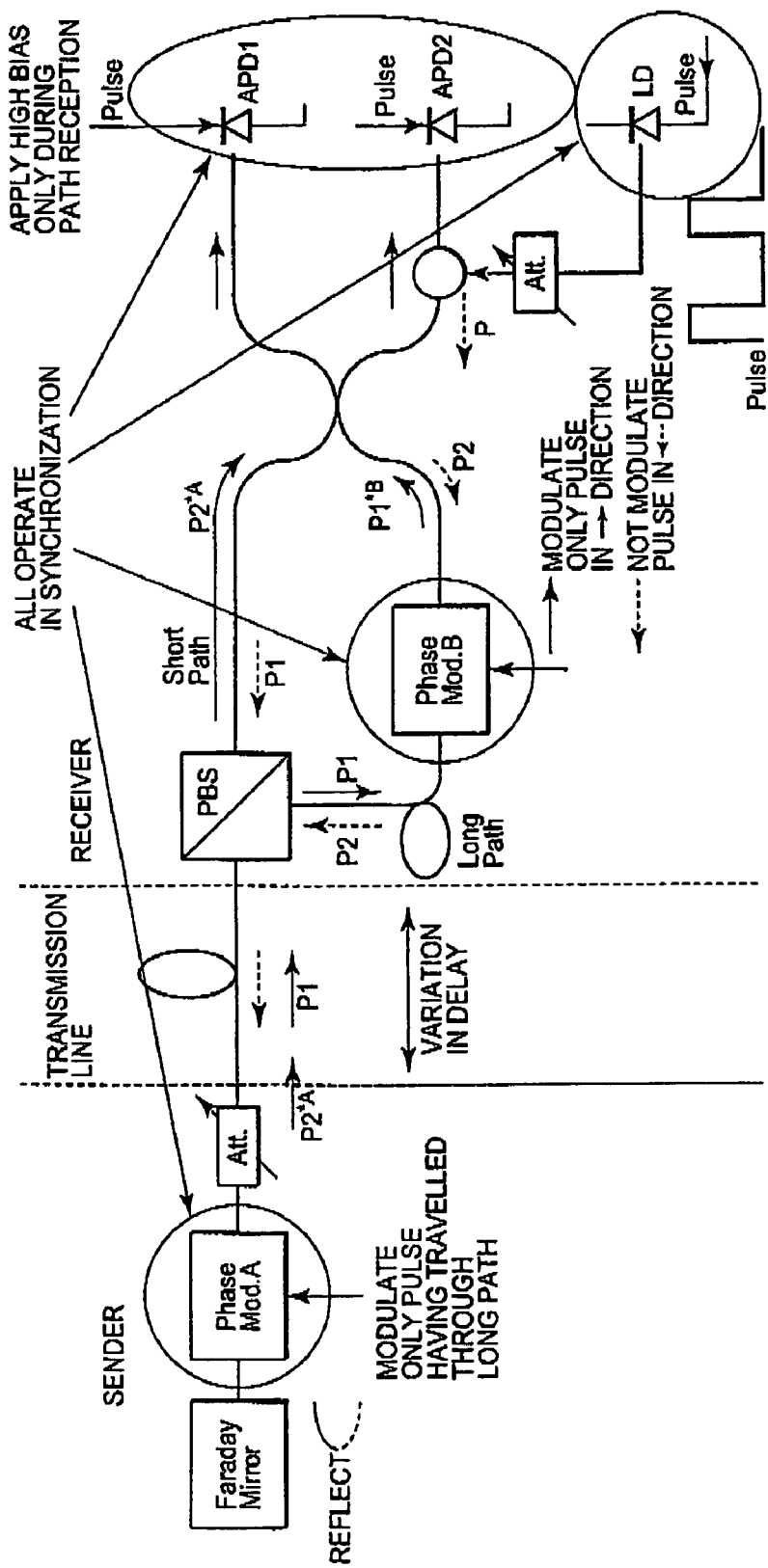
FIG. 2 is a schematic block diagram showing a conventional example of a quantum key distribution system based on a "Plug & Play" scheme.

Next, a detailed description will be given of an example of the application of the communication system according to the above-described first embodiment into a quantum key distribution system based on the "Plug & Play" scheme. Here, since the basic configuration and operation of a "Plug & Play" system have already been described using FIG. 2, the details thereof will be omitted.

Figure 4:
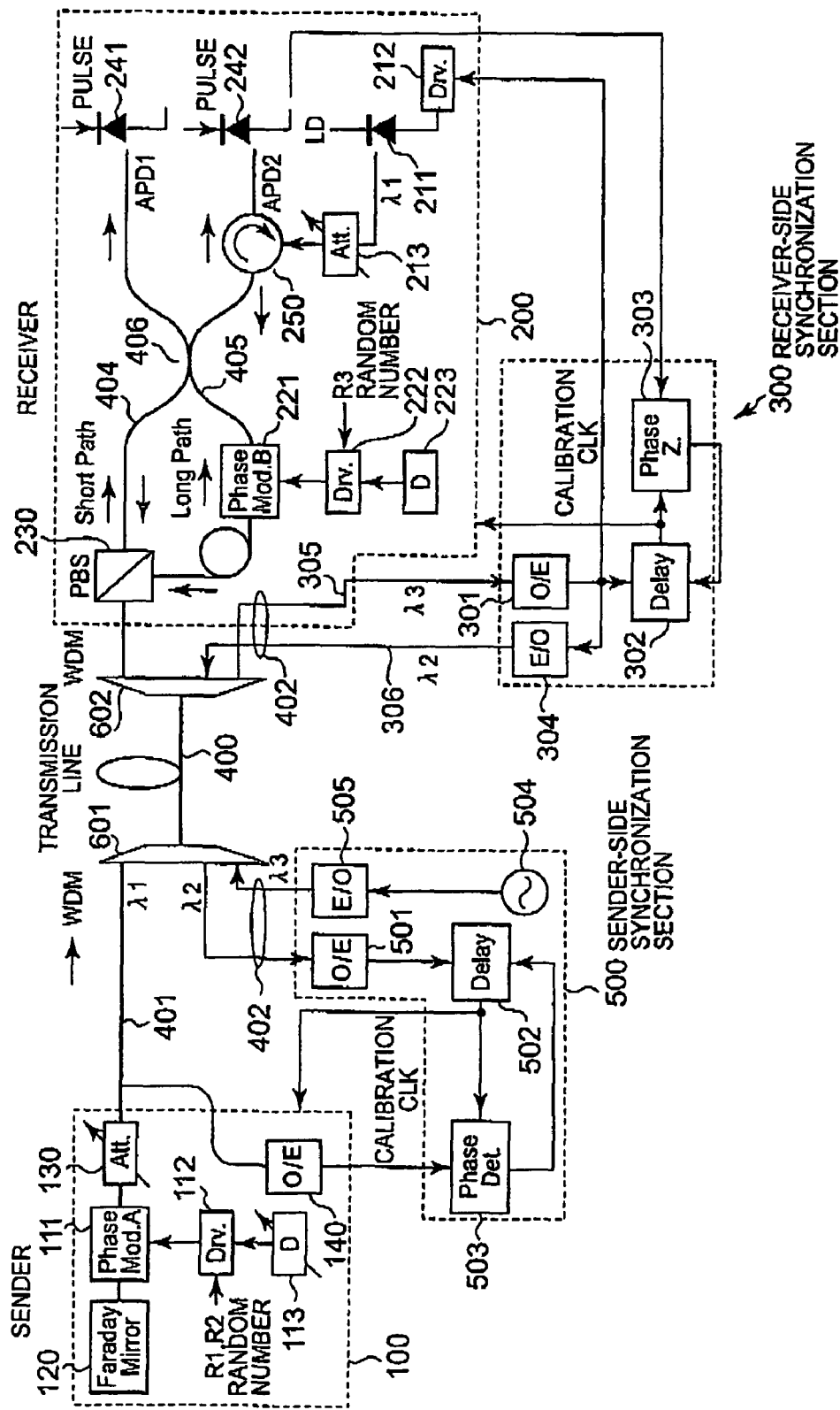
FIG. 4 is a block diagram showing a quantum key distribution system based on the "Plug & Play" scheme, according to a first example of the present invention.

FIG. 4 is a block diagram showing a quantum key distribution system based on the "Plug & Play" scheme, according to a first example of the present invention. In this example, used are a quantum channel 401 (corresponding to the quantum channel 51 in FIG. 3) at a wavelength λ1 and a classical channel 402 (corresponding to the classical channel 52 in FIG. 3) at wavelengths λ2 and λ3 for synchronization. Wavelength multiplexing splitters 601 and 602 are connected to each other through an optical fiber transmission line 400 (corresponding to the optical fiber 5 in FIG. 3). The quantum channel 401 at the wavelength λ1 is connected to each of quantum units 100 and 200. The classical channel 402 at the wavelengths λ2 and λ3 for synchronization is connected to each of synchronization sections 300 and 500.

The quantum unit 100 on the sender side (corresponding to the quantum unit 1 of the sender 10 in FIG. 3) has a phase modulator (Phase Mod. A) 111, a modulator-driving circuit (Drv.) 112, a delay-adjusting circuit (D) 113, a Faraday mirror 120, an optical attenuator (Att.) 130, and an optical-to-electrical converter (O/E) 140 for monitoring the quantum channel 401. During the quantum mode, the phase modulator 111 modulates the phase of an optical pulse reflected from the Faraday mirror 120 into any one of four phases (0, π/2, π, 3π/2) in accordance with a combination of two kinds of random numbers R1 and R2, and the optical attenuator 130 increases the amount of attenuation. During the training mode, the phase modulator 111 does not perform the phase modulation, and the optical attenuator 130 reduces the amount of attenuation. Switching between the quantum mode and the training mode is controlled by the communication controller (not shown).

The quantum unit 200 on the receiver side (corresponding to the quantum unit 2 of the receiver 20 in FIG. 3) has a laser (LD) 211, which is the light source of a wavelength-λ1 optical pulse, and a laser-driving circuit (Drv.) 212, which is the driver for the laser 211. The wavelength-λ1 optical pulse is injected into an optical circulator 250 via an optical attenuator (Att.) 213. The optical pulse ejected from the optical circulator 250 is split into two parts by an optical coupler 406; one goes along a short path 404, and the other goes along a long path 405. The optical pulse going along the long path 405 is phase-modulated by a phase modulator (Phase Mod. B) 221 and injected into a polarization beat splitter (PBS) 230. The phase modulator 221 is driven by a modulator-driving circuit (Drv.) 222 in accordance with random number R3, and the driving timing is adjusted by a delay-adjusting circuit (D) 223.

When the optical signal sent back by the sender as described already passes along the long path 405, the phase modulator 221 modulates the optical signal into two kinds of phases (0, π/2) in accordance with the random number R3. The optical signal modulated by the phase modulator 111 on the sender side and the optical signal modulated by the phase modulator 221 on the receiver side are made to interfere with each other at the optical coupler 406. The result thereof is detected by an avalanche photodiode (APD) 241 or 242.

Incidentally, the short path 404, the long path 405, the optical circulator 250 and the optical coupler 406 are of a polarization-maintaining type. The short path 404 and the long path 405 may be formed by polarization-maintaining fiber.

Additionally, during the quantum mode, it is required to reduce the pulse width of an optical pulse outputted from the laser 211 and thus to ensure such an interval that the optical pulses having traveled through the different paths, the short path 404 and the long path 405, can be sufficiently distinguished. During the training mode, however, there is no need to maintain such an interval between the optical pulses as in the quantum mode. Therefore, the laser-driving circuit 212 varies the pulse width of an optical pulse, depending on the mode (quantum mode or training mode).

The synchronization section 500 on the sender side (corresponding to the synchronization section 4 of the sender 10 in FIG. 3) is provided with a master clock 504 and an electrical-to-optical converter (E/O) 505. A clock signal outputted from the master clock 504 is converted into a wavelength-λ3 optical clock signal by the electrical-to-optical converter 505. The optical clock signal is then transmitted to the receiver through the wavelength-λ3 classical channel 402. Moreover, the synchronization section 500 also has an optical-to-electrical converter (O/E) 501, a delay element 502 and a phase comparator 503. The optical-to-electrical converter 501 converts an optical signal received from the receiver through the wavelength-λ2 classical channel 402, into an electrical signal.

The phase comparator 503 compares the phase of a clock signal of the wavelength-λ1 quantum channel 401, detected by the optical-to-electrical converter 140, with the phase of a clock signal of the classical channel 402, inputted from the delay element 502. The phase comparator 503 generates a calibration clock signal CLK by performing delay adjustment as described earlier and feeds the calibration clock signal CLK to the quantum unit 100.

The synchronization section 300 on the receiver side (corresponding to the synchronization section 3 of the receiver 20 in FIG. 3) has an optical-to-electrical converter (O/E) 301, a delay element 302, a phase comparator 303, and an electrical-to-optical converter (E/O) 304. The optical-to-electrical converter 301 converts the optical clock signal received from the sender through the wavelength-λ3 classical channel 402 into an electrical signal and outputs this clock signal to the electrical-to-optical converter 304 as a signal to be sent back. Further, the optical-to-electrical converter 301 also outputs this clock signal to each of the delay element 302 and the laser-driving circuit 212 in the quantum unit 200.

The electrical-to-optical converter 304 converts this clock signal to be sent back, received from the optical-to-electrical converter 301, into a wavelength-λ2 optical clock signal and transmits this optical clock signal to the sender through the wavelength-λ2 classical channel 402. At the same time, the laser-driving circuit 212 drives the laser 211 in accordance with the same clock signal received from the optical-to-electrical converter 301 to cause the laser 211 to generate a wavelength-λ1 optical pulse. The pulse width of the optical pulse at this time is controlled depending on whether in the quantum mode or training mode, as described earlier.

In the case of the training mode, the wavelength-λ1 optical pulse transmitted by the receiver through the quantum channel 401 arrives at the sender, where the optical pulse is returned, subjected neither to optical attenuation nor to phase modulation. The returned optical pulse goes along the same quantum channel 401 and arrives at the receiver, where the optical pulse is detected by the APD 242. The phase of the clock signal detected by the APD 242 is compared with the phase of the clock signal having traveled through the classical channel 402 by the phase comparator 303. Based on the result thereof, delay adjustment as described earlier is performed. Thus, a calibration clock signal CLK is generated and fed to the quantum unit 200.

As described hereinabove, the synchronization on the basis of the master clock 504 between the quantum units 100 and 200 can be established by the delay adjustments performed in the synchronization sections 500 and 300.

(Operation)

Figure 5:
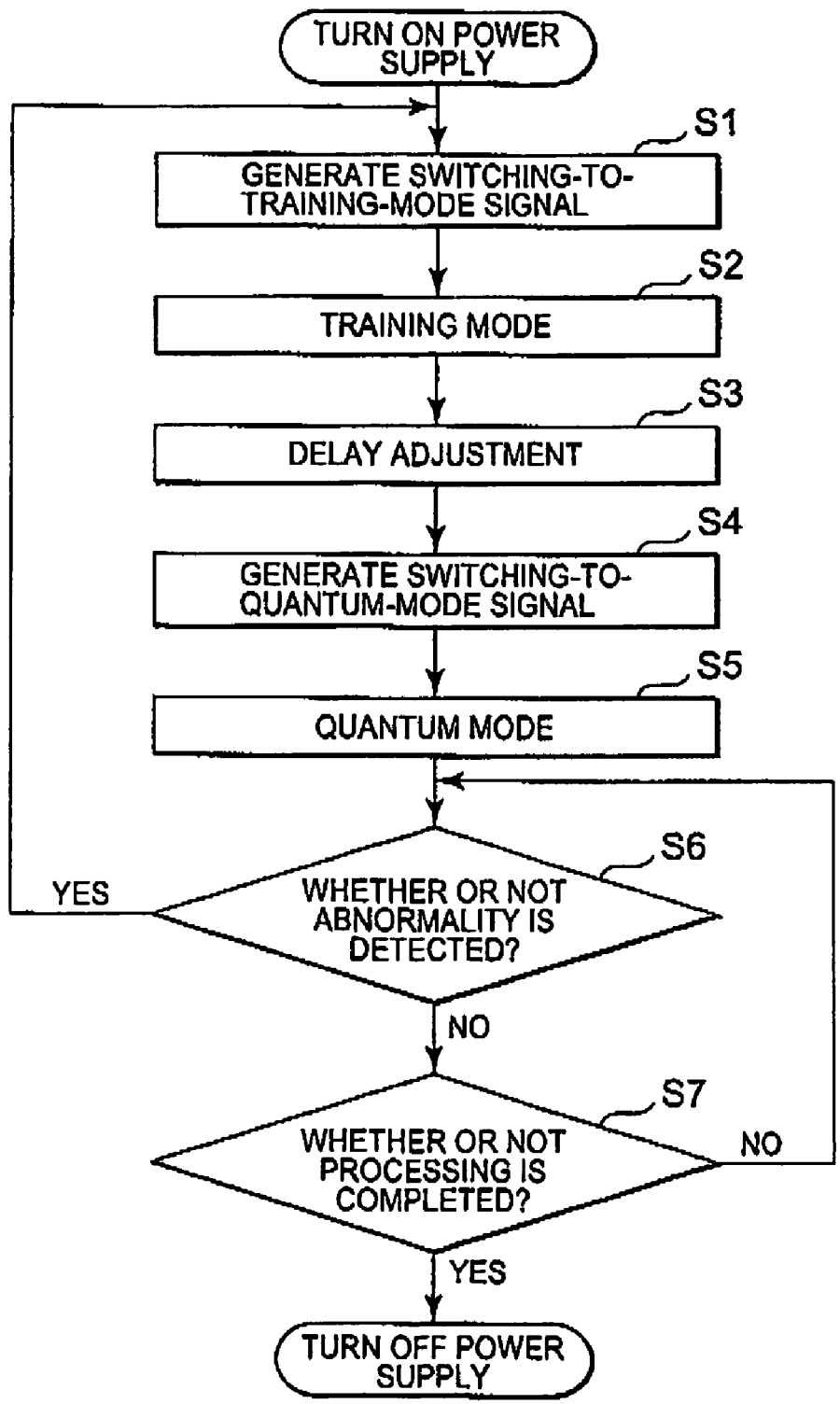
FIG. 5 is a flowchart showing mode-switching operations of a sender and a receiver in the quantum key distribution system according to the first example of the present invention.

FIG. 5 is a flowchart showing mode-switching operations on the sender side and the receiver side in the quantum key distribution system according to the first example of the present invention. First, when a power supply is turned on, each of the respective communication controllers (not shown) of the sender and the receiver generates a mode signal for switching to training mode (Step S1), causing the quantum unit 100 on the sender side and the quantum unit 200 on the receiver side to shift to the training mode (training mode: Step S2).

The training mode is a mode in which communications over the quantum channel 401 are performed with strong light at approximately the same optical power level as used in normal communications. This strong light in the training mode can be achieved as follows. The optical power is increased by reducing the amount of attenuation in the optical attenuator 213, which attenuates an optical pulse of the laser on the receiver side, and also by reducing the amount of attenuation in the optical attenuator 130 for the quantum channel 401 on the sender side. Moreover, the mark ratio is made larger than that in the quantum mode by widening the pulse width of a driving current with which the laser-driving circuit 212 drives the laser 211. This is because, in the training mode, as described earlier, there is no need to distinguish between the optical pulses traveling through the different paths, the short path 404 and the long path 405, on the receiver side.

When the optical power over the quantum channel 401 is as strong as used in normal communications, it is possible to extract a clock signal from the quantum channel 401. In the quantum unit 100 on the sender side, the optical-to-electrical converter 140 extracts a clock signal out of a received optical signal and outputs the clock signal to the phase comparator 503. In the quantum unit 200 on the receiver side, the APD 242 detects an optical clock signal, extracts a clock signal, and outputs the clock signal to the phase comparator 303.

In the sender side, the phase comparator 503 compares the clock signal extracted from the quantum channel 401 by the optical-to-electrical converter 140 with a clock signal extracted from the classical channel 402 by the optical-to-electrical converter 501. The phase comparator 503 then feeds its comparison result back to the delay element 502 so that a phase difference found by this comparison becomes zero (delay adjustment: Step S3).

The optical signal on the quantum channel 401 is reflected by the Faraday mirror 120 and returned over the quantum channel 401 as it is, without being modulated by the phase modulator 111, nor being reduced in optical power by the optical attenuator 130.

On the other hand, in the quantum unit 200 on the receiver side, the APD 242 receives the optical pulse on the quantum channel 401. This is because, since the optical signal has not been modulated by the phase modulator 111 in the quantum unit 100 on the sender side, the modulation phase at the quantum unit 100 on the sender side matches the modulation phase at the quantum unit 200 on the receiver side, and therefore an output of the optical pulse to the APD 242 is uniquely given.

The phase comparator 303 compares the clock signal (synchronization signal) received by the APD 242 with a clock signal extracted from the classical channel 402 by the optical-to-electrical converter 301. Then, the phase comparator 303 feeds its comparison result back to the delay element 302 so that a phase difference found by this comparison becomes zero (delay adjustment: Step S3).

Once the respective phase differences have become zero and the respective amounts of delay in the delay elements 502 and 302 have been determined both in the synchronization section 500 on the sender side and the synchronization section 300 on the receiver side, then each of the respective communication controllers issues a mode signal for switching to quantum mode (Step S4). Upon receiving the switching-to-quantum-mode signal, each of the quantum unit 100 on the sender side and the quantum unit 200 on the receiver side shifts to the quantum mode (Step S5).

The quantum mode is a mode in which the optical power over the quantum channel 401 is very weak, with one photon per bit. This very weak light in the quantum mode is achieved as follows. The optical power is weakened by increasing the amount of attenuation in the optical attenuator 130 for the quantum channel 401 on the sender side. Moreover, the mark ratio is lowered by narrowing the pulse width of a driving current with which the laser-driving circuit 212 on the receiver side drives the laser 211. This is because it is required to distinguish between the optical pulses traveling through the different paths, the short path 404 and the long path 405, on the receiver side. The quantum cryptographic key creation is carried out in this quantum mode.

During the quantum-mode operation, the quantum units 100 and 200 are in the synchronization state on the basis of the master clock 504, by the determination of the respective amounts of delay through the delay adjustments described above. That is, the phase modulator 111 in the quantum unit 100 on the sender side is driven by a signal in synchronization with a clock signal calibrated by the synchronization section 500, and the phase modulator 221 and the APD 241 or 242 in the quantum unit 200 on the receiver side are driven by a signal in synchronization with a clock signal calibrated by the synchronization section 300.

Each of the communication controllers of the sender and the receiver determines whether or not an abnormality (e.g., lock abnormality in the DLL) occurs in the quantum mode (step S6). When the occurrence of an abnormality is detected (Step S6: YES), the process returns to Step S1 to generate a switching-to-training-mode signal again. When an abnormality is not detected (Step S6: NO) and the completion of the processing is not detected either (Step S1: NO), the abnormality detection processing (Step S6) is repeated. On the other hand, when the processing is completed (Step S7: YES), the power supply is turned off.

As described hereinabove, in this example, a propagation delay difference due to wavelength dispersion between the quantum channel 401 and the classical channel 402 can be calibrated automatically independently of the transmission line. As a result, in this example, synchronization between the quantum unit 100 on the sender side and the quantum unit 200 on the receiver side can be established by using the classical channel 402 at a different wavelength from that of the quantum channel 401, instead of using the quantum channel 401 from which a clock signal cannot be extracted because of the very weak light.

Conventionally, when communications were performed using a quantum channel with light at a very small optical power level, the light hardly reached a receiver. Therefore, for example, even if a sender sent data with a mark ratio of 1/2, the mark ratio became far smaller than 1/2 at a receiver, resulting in data losses. Accordingly, it was impossible to extract a clock signal having an accurate period.

In contract, in the present example, communication over the quantum channel 401 is performed, as the training mode, with strong light at approximately the same optical power level as used in normal communications. Accordingly, for example, when the sender sends data with a mark ratio of 1/2, the mark ratio becomes also 1/2 on the receiver side, with no loss of the data. Therefore, it is possible to extract an accurate-period clock signal. By utilizing this, synchronization can be easily established between the quantum unit on the sender side and the quantum unit on the receiver side, even if there is a propagation delay difference between the quantum channel and the classical channel.

1.2) SECOND EXAMPLE

Figure 6:
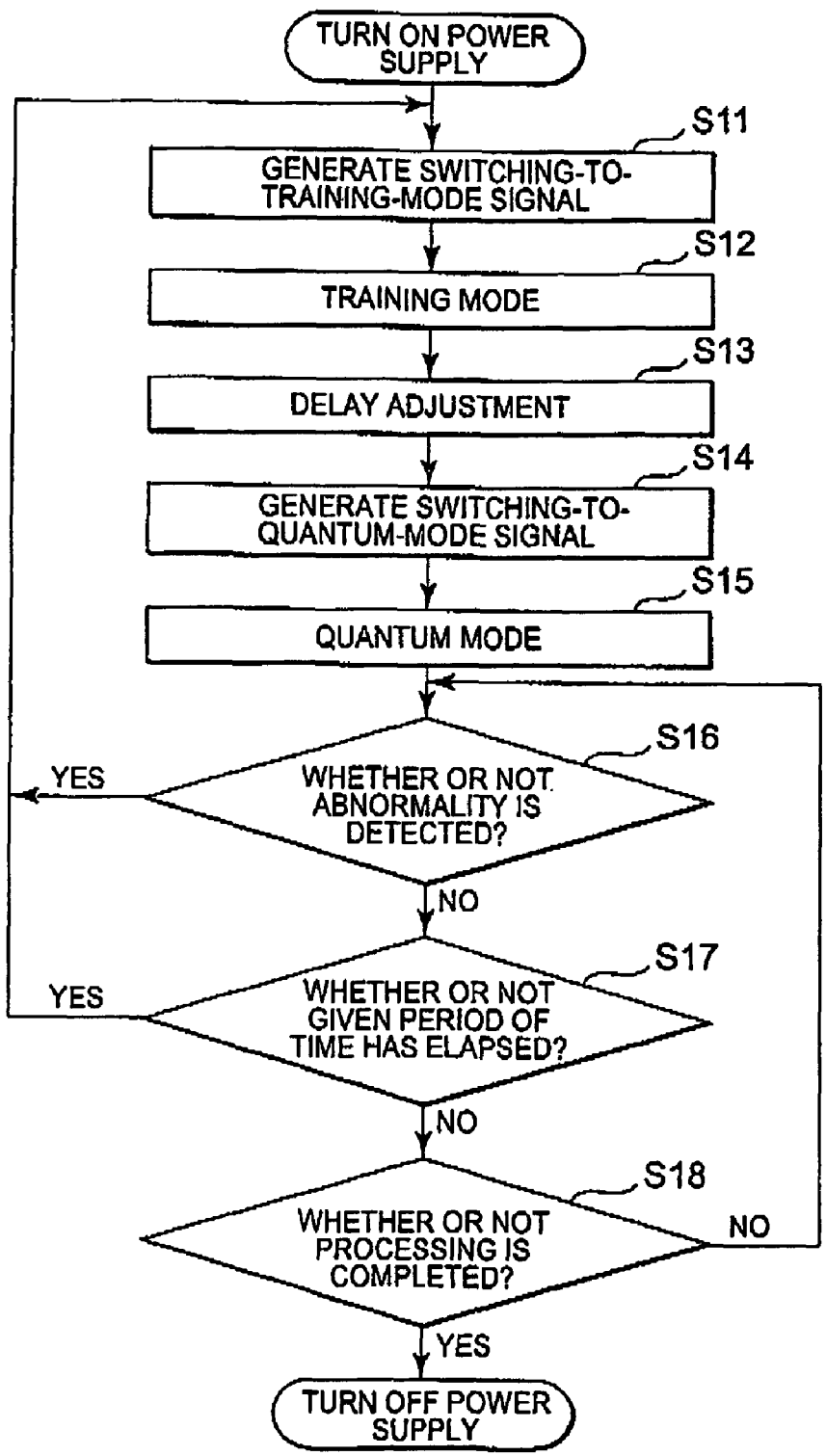
FIG. 6 is a flowchart showing mode-switching operations of a sender and a receiver, according to a second example of the present invention.

FIG. 6 is a flowchart showing mode-switching operations on the sender side and the receiver side according to a second example of the present invention. In the second example, the configurations of the devices are similar to those of the first example shown in FIG. 4, and therefore a description will be given only of the mode-switching operations on the sender side and the receiver side in the second example.

In FIG. 6, Steps S11 to S13 correspond to Steps S1 to S3 in FIG. 5 described in the first example, respectively. In Steps S11 to S13, the delay adjustments in the training mode are executed, whereby synchronization is established between the quantum units 100 and 200. Upon shifting to the quantum mode through subsequent Steps S14 and S15, each communication controller starts a timer set for a given period of time and also determines whether or not an abnormality, such as a lock abnormality in the DLL, occurs (Step S16). When the occurrence of an abnormality is detected (Step 316: YES), the process returns to Step S11 to generate a switching-to-training-mode signal again.

When an abnormality is not detected (Step S16: NO), each communication controller determines whether or not the given period of time has elapsed (Step S17). When the elapse of the given period of time is not detected (Step S17: NO) and the completion of the processing is not detected either (Step S18: NO), the abnormality detection processing (Step S16) is repeated.

When an abnormality is detected (Step S16: YES) or the given period of time has elapsed (step S17: YES), the process returns to Step S11 to switch into the training mode. When the completion of the processing is detected (Step S18: YES), the power supply is turned off.

As described hereinabove, in this second example, as in the aforementioned first example, it is possible to automatically calibrate a propagation delay difference due to wavelength dispersion between the quantum channel 401 and the classical channel 402, independently of the transmission line. As a result, synchronization between the quantum unit 100 on the sender side and the quantum unit 200 on the receiver side can be established by using the classical channel 402 at a different wavelength from that of the quantum channel 401, instead of using the quantum channel 401 from which a clock signal cannot be extracted because of the very weak light. Moreover, in this second example, the elapse of a given period of time is monitored in Step S17. If the given period of time has elapsed, the mode is switched into the training mode again, where the synchronization between the quantum units is adjusted. Therefore, by properly setting the given period of time, regular calibration can be carried out every given period of time. Thus, a further reliable quantum key distribution system can be achieved.

1.3) THIRD EXAMPLE

Figure 7:
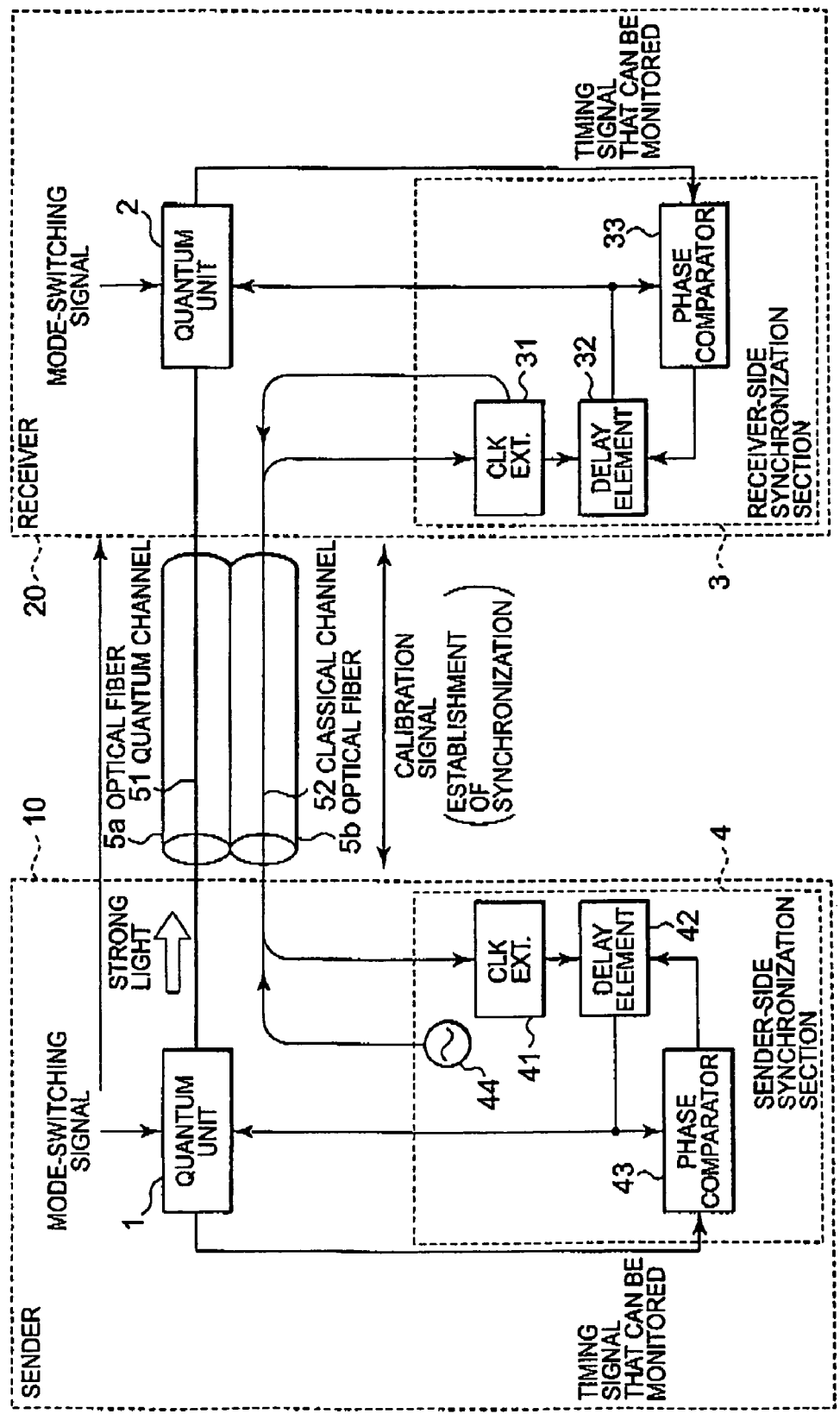
FIG. 7 is a schematic block diagram showing a configuration of a communications system according to a third example of the present invention.

FIG. 7 is a schematic block diagram showing a configuration of a communication system according to a third example of the present invention. Note that the same blocks and functional sections as those of the configuration shown in FIG. 3 will be denoted by the same reference numerals, and the details thereof will be omitted.

Although the communication system shown in FIG. 3 is a WDM (Wavelength Division Multiplexing) system using the optical fiber 5, the communication system shown in FIG. 7 is configured to provide clock synchronization by using another optical fiber 5b in the same cable.

In the WDM system, when an optical signal is divided or multiplexed, losses due to an optic for division or multiplexing may occur. In this third example, however, in order to prevent those losses, clock synchronization is provided by using the other optical fiber 5b in the same cable. In this case, since the optical fibers are accommodated in the same cable, the physical lengths of the optical fibers are substantially the same. However, because of manufactural variations, a plurality of optical fibers in the same cable do not always have the same length of optical transmission line.

That is, in this third example, a quantum signal and a synchronization signal are not propagated over the same transmission line. Therefore, strictly speaking, the lengths of the transmission lines are not equal to each other, resulting in the occurrence of a propagation delay difference between the quantum signal and the synchronization signal. Moreover, in this third example, since the other optical fiber 5b is used, the same wavelength can be employed for the quantum signal and the synchronization signal. However, if different wavelengths are employed, a propagation delay difference due to wavelength dispersion may also occur between the quantum signal and the synchronization signal. Nonetheless, these propagation delay differences can be calibrated by the delay adjustments at the synchronization sections 3 and 4 as described already. The specific training-mode operation and delay adjustment are the same as those described using FIG. 3, and therefore a description thereof will be omitted.

Note that the present invention can apply not only to a two-way system such as the "Plug & Play" system used in the above-described first to third examples, but also to one-way quantum communication. The technique of the present invention is effective, irrespective of the form of quantum communication. In addition, the master clock 44 may be provided to the receiver-side synchronization section 3, not to the sender-side synchronization section 4. Furthermore, the connection between a sender and a receiver is not necessarily 1:1 connection, but may be 1:N connection (N is an integer not less than two).

2. Second Embodiment

Figure 8:
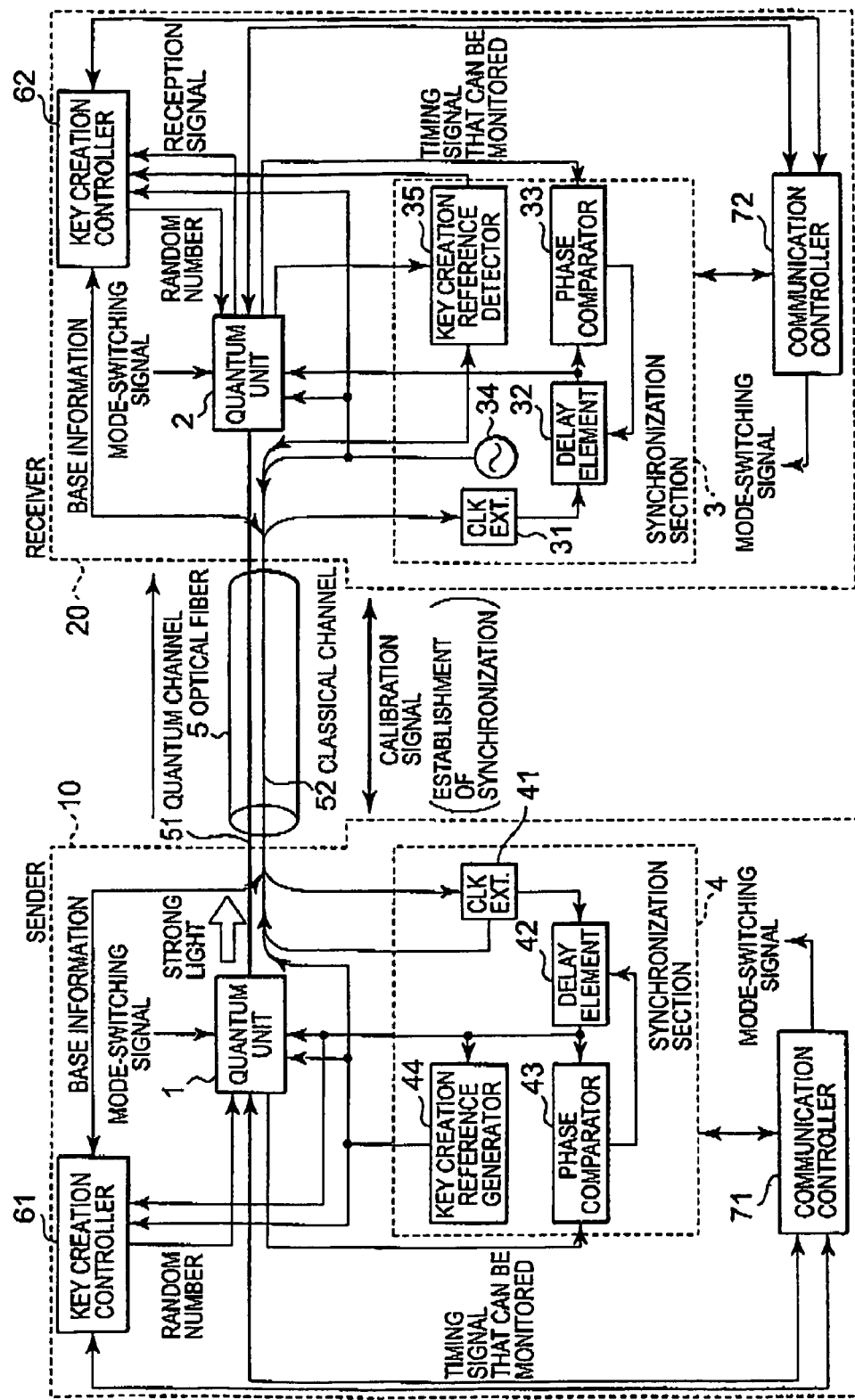
FIG. 8 is a block diagram showing a general configuration of a communications system according to a second embodiment of the present invention.

FIG. 8 is a block diagram showing a general configuration of a communication system according to a second embodiment of the present invention. In this system, a sender 10 and a receiver 20 are connected to each other through an optical fiber transmission line 5, which includes a quantum channel 51 and a classical channel 52. The quantum channel 51 and the classical channel 52 are different wavelength channels on the same transmission line (optical fiber transmission line 5). Note, however, that the classical channel 52 of this embodiment is composed of a plurality of channels.

The sender 10 includes a quantum unit 1, a synchronization section 4, a key creation controller 61, and a communication controller 71. The receiver 20 includes a quantum unit 2, a synchronization section 3, a key creation controller 62, and a communication controller 72. As will be described later, the quantum units 1 and 2 create a cryptographic key, called a raw key, through the quantum channel 51. The sender 10 and the receiver 20 establish synchronization between the quantum units 1 and 2 by using the quantum channel 51 and the classical channel 52, which are different wavelength channels. After the synchronization has been established, the key creation controllers 61 and 62 create and share a final key based on the created raw key, through the classical channel 52.

The synchronization section 3 of the receiver 20 has a clock extractor 31, a delay element 32, a phase comparator 33, a master clock 34, and a key creation reference detector 35. As will be described later, in the delay element 32, the amount of delay is controlled depending on a result of comparison made by the phase comparator 33. The synchronization section 4 of the sender 10 has a clock extractor 41, a delay element 42, a phase comparator 43, and a key creation reference generator 44. As will be described later, in the delay element 42, the amount of delay is controlled depending on a result of comparison made by the phase comparator 43.

Each of the quantum unit 1 of the sender 10 and the quantum unit 2 of the receiver 20 shifts to a training mode when receiving a switching-to-training-mode signal from its corresponding communication controller 71 or 72. In the training mode, an optical signal at approximately the same optical power level as over the classical channel is transmitted over the quantum channel 51, whereby it becomes possible for each quantum unit to extract a clock signal.

For example, when the switching-to-training-mode signal is inputted, the quantum unit 2 of the receiver 20 transmits as strong light as used in normal communications over the quantum channel 51, in accordance with a clock signal of the master clock 34. The quantum unit 1 of the sender 10 extracts a clock signal out of the optical clock signal received through the quantum channel 51, and outputs the extracted clock signal to the phase comparator 43. At the same time, the quantum unit 1 returns the received optical clock signal to the receiver 20.

The master clock 34 transmits the same clock signal that is fed to the quantum unit 2, to the sender 10 through the classical channel 52. The clock extractor 41 in the synchronization section 4 of the sender 10 extracts a clock signal out of the signal received through the classical channel 52, and sends the extracted clock signal, as it is, back to the receiver 20 over the classical channel 52. In addition, the extracted clock signal is delayed in the delay element 42, and then outputted to each of the phase comparator 43, the key creation reference generator 44 and the quantum unit 1.

The phase comparator 43 compares the phase of the clock signal of the quantum channel 51, monitored by the quantum unit 1, with the phase of the clock signal of the classical channel 52, inputted from the delay element 42. The phase comparator 43 then controls the amount of delay in the delay element 42 so that a phase deviation found by this comparison is compensated. That is, the phase comparator 43 and the delay element 42 constitute a delay lock loop (DLL).

The clock extractor 31 in the synchronization section 3 of the receiver 20 extracts the clock signal returned from the sender 10 through the classical channel 52. The extracted clock signal is delayed in the delay element 32 and then outputted to each of the phase comparator 33 and the quantum unit 2. The phase comparator 33 compares the phase of the clock signal of the quantum channel 51, monitored by the quantum unit 2, with the phase of the clock signal of the classical channel 52, inputted from the delay element 32. The phase comparator 33 then controls the amount of delay in the delay element 32 so that a phase deviation found by this comparison is compensated. That is, the phase comparator 33 and the delay element 32 constitute a delay lock loop (DLL).

The respective amounts of delay are thus adjusted at the sender 10 and the receiver 20, whereby synchronization on the basis of the master clock 34 is established. Once the synchronization is established, the quantum unit 1 of the sender 10 and the quantum unit 2 of the receiver 20 can execute the undermentioned key creation synchronization processing in accordance with the respective clock signals that are synchronized with each other.

As mentioned above, in the training mode, it becomes possible for each quantum unit to extract a clock signal, by transmitting over the quantum channel 51 an optical signal at approximately the same optical power level as over the classical channel. Accordingly, it will be possible that the key creation reference detector 35 of the receiver 20 detects a phase difference between key creation reference signals received through the quantum channel 51 and the classical channel 52 respectively, by transmitting the key creation reference signal generated by the key creation reference generator 44, to the receiver 20 through both the quantum channel 51 and the classical channel 52. Thus, key creation synchronization can be established by using the quantum channel 51 and the classical channel 52.

Incidentally, when switching into any one of the training mode, a key creation synchronization processing mode and a quantum mode, the sender 10 and the receiver 20 exchange a switching request and related responses through the classical channel 52, whereby they notify each other to switch into any one of the above modes. Each of the communication controller 71 of the sender 10 and the communication controller 72 of the receiver 20 outputs one of a switching-to-training-mode signal, switching-to-key-creation-synchronization-processing signal and switching-to-quantum-mode signal, depending on this switching notification.

Note that each of the key creation controller 61 and the communication controller 71 of the sender 10, and each of the key creation controller 62 and the communication controller 72 of the receiver 20 can also be implemented by executing programs for communication control and key creation synchronization control on a program-controlled processor, which will be described later.

2.1) FOURTH EXAMPLE

Next, a detailed description will be given of an example of the application of the communications system according to the above-described second embodiment into a quantum key distribution system based on the "Plug & Play" scheme. Note that the basic configuration and operation of a "Plug & Play" system have already been described using FIG. 2, and therefore the details thereof will be omitted.

(Configuration)

Figure 9:
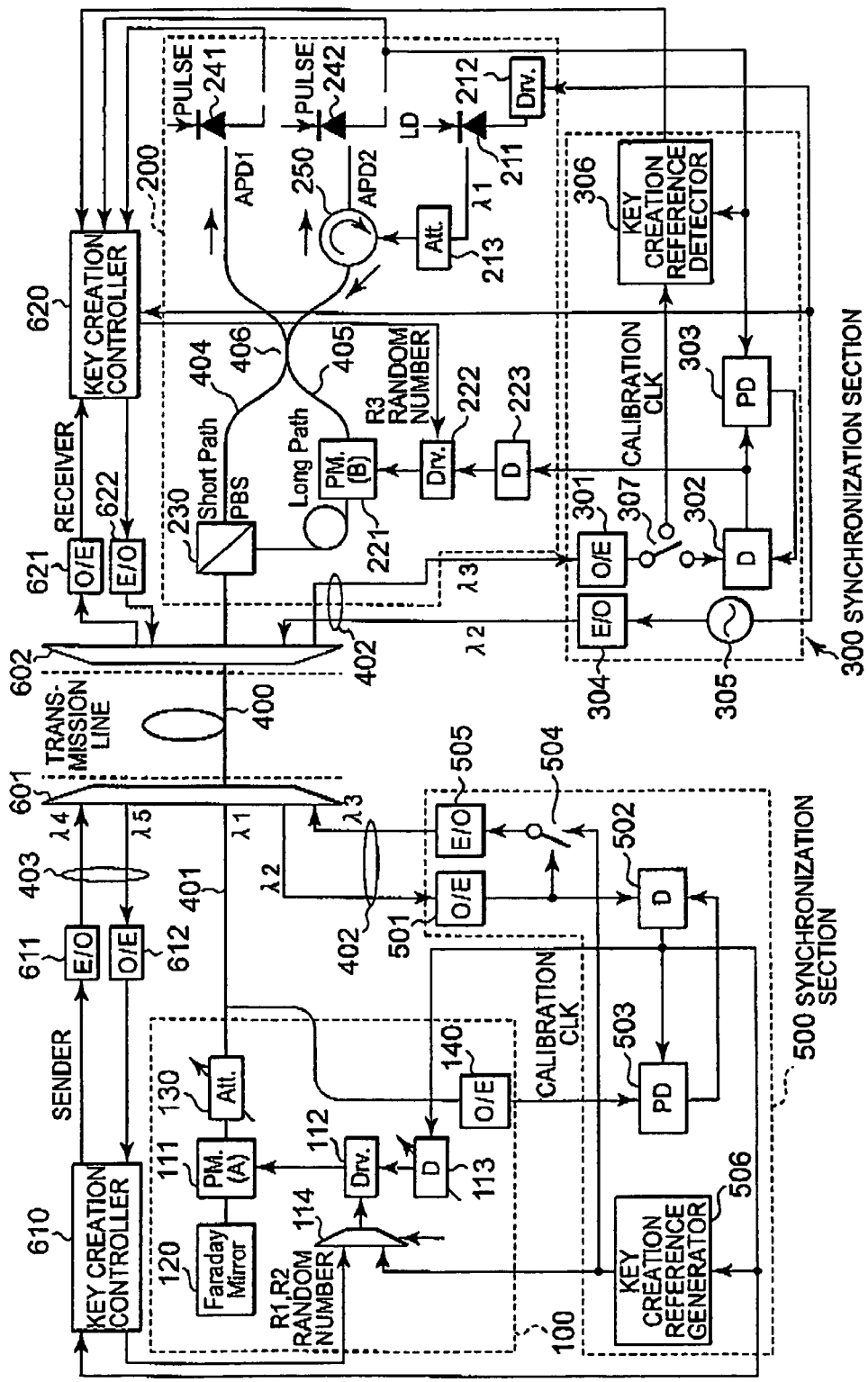
FIG. 9 is a block diagram showing a quantum key distribution system based on the "Plug & Play" scheme, according to a fourth example of the present invention.

FIG. 9 is a block diagram showing a quantum key distribution system based on the "Plug & Play" scheme, according to a fourth example of the present invention. In this example, used are a quantum channel 401 (corresponding to the quantum channel 51 in FIG. 8) at a wavelength λ1, a classical channel 402 (corresponding to the classical channel 52 in FIG. 8) at wavelengths λ2 and λ3 for synchronization, and a classical channel 403 (corresponding to the classical channel 52 in FIG. 8) at wavelengths λ4 and λ5 for key creation wavelength multiplexing splitters 601 and 602 are connected to each other through an optical fiber transmission line 400 (corresponding to the optical fiber 5 in FIG. 8).

The quantum channel 401 at the wavelength λ1 is connected to each of quantum units 100 and 200, and the classical channel 402 at the wavelengths λ2 and λ3 for synchronization is connected to each of synchronization sections 300 and 500. Moreover, the classical channel 403 at the wavelengths λ4 and λ5 for key creation is connected to a key creation controller 610 via an electrical-to-optical converter (E/O) 611 and an optical-to-electrical converter (O/E) 612, and also to a key creation controller 620 via an optical-to-electrical converter (O/E) 621 and an electrical-to-optical converter (E/O) 622.

The quantum unit 100 on the sender side has a phase modulator (PM. (A)) 111, a modulator-driving circuit (Drv.) 112, a delay-adjusting circuit (D) 113, a Faraday mirror 120, and an optical attenuator (Att.) 130. The quantum unit 100 further has a selector 114 for selecting one of a key creation reference signal and a set of random numbers R1 and R2, and an optical-to-electrical converter (O/E) 140 for monitoring the quantum channel.

During the training mode, the phase modulator 111 does not perform phase modulation, and the optical attenuator 130 sets the amount of attenuation to be small in order to transmit strong light.

During the key creation synchronization processing, the selector 114 selects a key creation reference signal. The phase modulator 111 modulates the phase of an optical pulse reflected from the Faraday mirror 120 into a phase of 0 or π, in accordance with the value (0 or 1) of the key creation reference signal. Moreover, the amount of attenuation in the optical attenuator 130 is set to be small in order to transmit strong light.

During the quantum mode, the selector 114 selects a set of the random numbers R1 and R2. The phase modulator 111 modulates the phase of an optical pulse reflected from the Faraday mirror 120 into any one of four phases of 0, π/2, π, and 3π/2 that correspond to combinations of the random numbers R1 and R2, in accordance with a calibration clock signal from the synchronization section 500. Moreover, the optical attenuator 130 sets the amount of attenuation to be large in order to transmit weak light. Switching between these operation modes is controlled by a communication controller 71 (see FIG. 8).

The quantum unit 200 on the receiver side has a laser (LD) 211, which is the light source of a wavelength-λ1 optical pulse, and a laser-driving circuit 212, which is the driver for the laser 211. The wavelength-λ1 optical pulse is injected into an optical circulator 250 via an optical attenuator (Att.) 213. The optical pulse ejected from the optical circulator 250 is split into two parts by an optical coupler 406; one goes along a short path 404, and the other goes along a long path 405. The optical pulse going along the long path 405 is injected into a polarization beam splitter (PBS) 230 via a phase modulator (PM. (B)) 221. The phase modulator 221 is driven by a modulator-driving circuit (Drv.) 222 in accordance with random number R3, and the driving timing is adjusted by a delay-adjusting circuit (D) 223.

Although the random number R3 is fed by the key creation controller 620, it is also possible that only one value is fed to fix the phase of the phase modulator 221 at one phase. As will be described later, during the key creation synchronization processing, setting can be made, by fixing the phase of the phase modulator 221 at 0, such that an avalanche photodiode (APD) 242 will detect a value of 1 of the key creation reference signal received from the sender.

During the quantum mode, when the optical signal returned from the sender as described already passes along the long path 405, the phase modulator 221 modulates the optical signal using two phases of 0 and π/2 in accordance with the random number R3. The optical signal phase-modulated by the phase modulator 111 on the sender side and the optical signal phase-modulated by the phase modulator 221 on the receiver side are made to interfere with each other at the optical coupler 406. The result thereof is detected by an APD 241 or the APD 242. Note that the short path 404 and the long path 405 may be formed with polarization-maintaining fiber, and the optical circulator 250 and the optical coupler 406 are of a polarization-maintaining type.

Incidentally, during the quantum mode, it is required to reduce the pulse width of an optical pulse outputted from the laser 211 and thus to maintain a necessary interval between the optical pulses traveling through the different paths, the short path 404 and the long path 405, so that the optical pulses can be sufficiently distinguished. However, during the training mode, there is no need to maintain such an interval between the optical pulses as in the quantum mode. Therefore, the laser-driving circuit 212 varies the pulse width of an optical pulse, depending on the mode (quantum mode or training mode).

The synchronization section 500 on the sender side is provided with an optical-to-electrical converter (O/E) 501, a delay element 502 and a phase comparator 503. The optical-to-electrical converter 501 converts an optical clock signal received from the receiver through the wavelength-λ2 classical channel 402 into an electrical signal. The clock signal received by the optical-to-electrical converter 501 is outputted to each of the delay element 502 and a selector 504.

In normal condition, the selector 504 forwards the clock signal received by the optical-to-electrical converter 501 to an electrical-to-optical converter (E/O) 505. The electrical-to-optical converter 505 converts this clock signal into a wavelength-λ3 optical clock signal and returns this optical clock signal to the receiver through the wavelength-λ3 classical channel 402.

The synchronization section 500 is further provided with a key creation reference generator 506, which outputs a key creation reference signal to each of the selector 114 in the quantum unit 100 and the selector 504 in the synchronization section 500 simultaneously, during the key creation synchronization processing. During the key creation synchronization processing, the selector 504 selects the key creation reference signal and forwards it to the electrical-to-optical converter 505. The electrical-to-optical converter 505 converts this key creation reference signal into a wavelength-λ3 optical signal and transmits this optical signal to the receiver through the wavelength-λ3 classical channel 402.

During the training mode, the phase comparator 503 compares the phase of the clock signal of the wavelength-λ1 quantum channel 401, detected by the optical-to-electrical converter 140, with the phase of the clock signal of the classical channel 402, inputted from the delay element 502. Then, a calibration clock signal CLK is generated by performing delay adjustment as described earlier. This calibration clock signal CLK is distributed to each of the delay-adjusting circuit 113 in the quantum unit 100, the key creation reference generator 506 and the key creation controller 610.

The synchronization section 300 on the receiver side has an optical-to-electrical converter (O/E) 301, a delay element 302, a phase comparator 303, an electrical-to-optical converter (E/O) 304, a master clock 305, a key creation reference detector 306, and a selector 307. A clock signal of the master clock 305 is converted into a wavelength-λ2 optical clock signal by the electrical-to-optical converter 304 and transmitted to the sender through the classical channel 402. At the same time, the clock signal is also outputted to each of the laser-driving circuit 212 in the quantum unit 200 and the key creation controller 620. The laser-driving circuit 212 drives the laser 211 to cause it to generate a wavelength-λ1 optical pulse. The pulse width of the optical pulse at this time is controlled, as described earlier, depending on whether in the quantum mode or training mode.

The optical-to-electrical converter 301 converts the optical signal received from the sender through the wavelength-λ3 classical channel 402 into an electrical signal. This received signal is forwarded by the selector 307 to a selected one of the delay element 302 and the key creation reference detector 306. In normal condition, the selector 307 forwards the received signal to the delay element 302, as a clock signal. During the key creation synchronization processing, however, the selector 307 forwards the received signal to the key creation reference detector 306, as a key creation reference signal.

During the training mode, a wavelength-λ1 optical pulse with a long pulse width is outputted from the laser 211. The optical pulse then arrives at the sender through the quantum channel 401. On the sender side, the optical pulse is returned as it is, subjected neither to optical attenuation nor to phase modulation. Traveling through the same quantum channel 401, the optical pulse arrives at the receiver, where the optical pulse is detected as a clock signal by the APD 242. The phase of the clock signal detected by the APD 242 is compared with the phase of the clock signal having traveled through the classical channel 402 by the phase comparator 303. Based on a result of this comparison, delay adjustment as described earlier is carried out. Thus, a calibration clock signal CLK is generated. With this calibration clock signal, the phase modulation timing of the quantum unit 200 is accurately set during the key creation synchronization processing and the quantum mode.

During the key creation synchronization processing, a wavelength-λ1 optical pulse from the laser 211 of the receiver arrives at the sender through the quantum channel 401. On the sender side, the optical pulse is phase-modulated in accordance with the key creation reference signal generated by the key creation reference generator 506. The phase-modulated optical pulse then arrives at the receiver through the same quantum channel 401. By fixedly setting the phase of the phase modulator 221 at a given phase, the APD 242 can detect the phase-modulated optical pulse only when its value is 1. The signal detected by the APD 242 is inputted as a key creation reference signal into the key creation reference detector 306.

Moreover, the key creation reference signal received through the classical channel 402 is also inputted into the key creation reference detector 306 via the selector 307. The key creation reference detector 306 detects a timing deviation between these key creation reference signals and outputs an error signal indicative of the timing deviation to the key creation controller 620.

Incidentally, when switching into one of the training mode, the key creation synchronization processing mode and the quantum mode, the sender and the receiver exchange a switching request and related responses through the classical channel 402, whereby they notify each other to switch into any one of the modes. Each of the communication controller 71 of the sender and the communication controller 72 of the receiver outputs a switching-to-training-mode signal, switching-to-key-creation-synchronization-processing signal, or switching-to-quantum-mode signal, depending on this switching notification.

(Training Mode)

Figure 10:
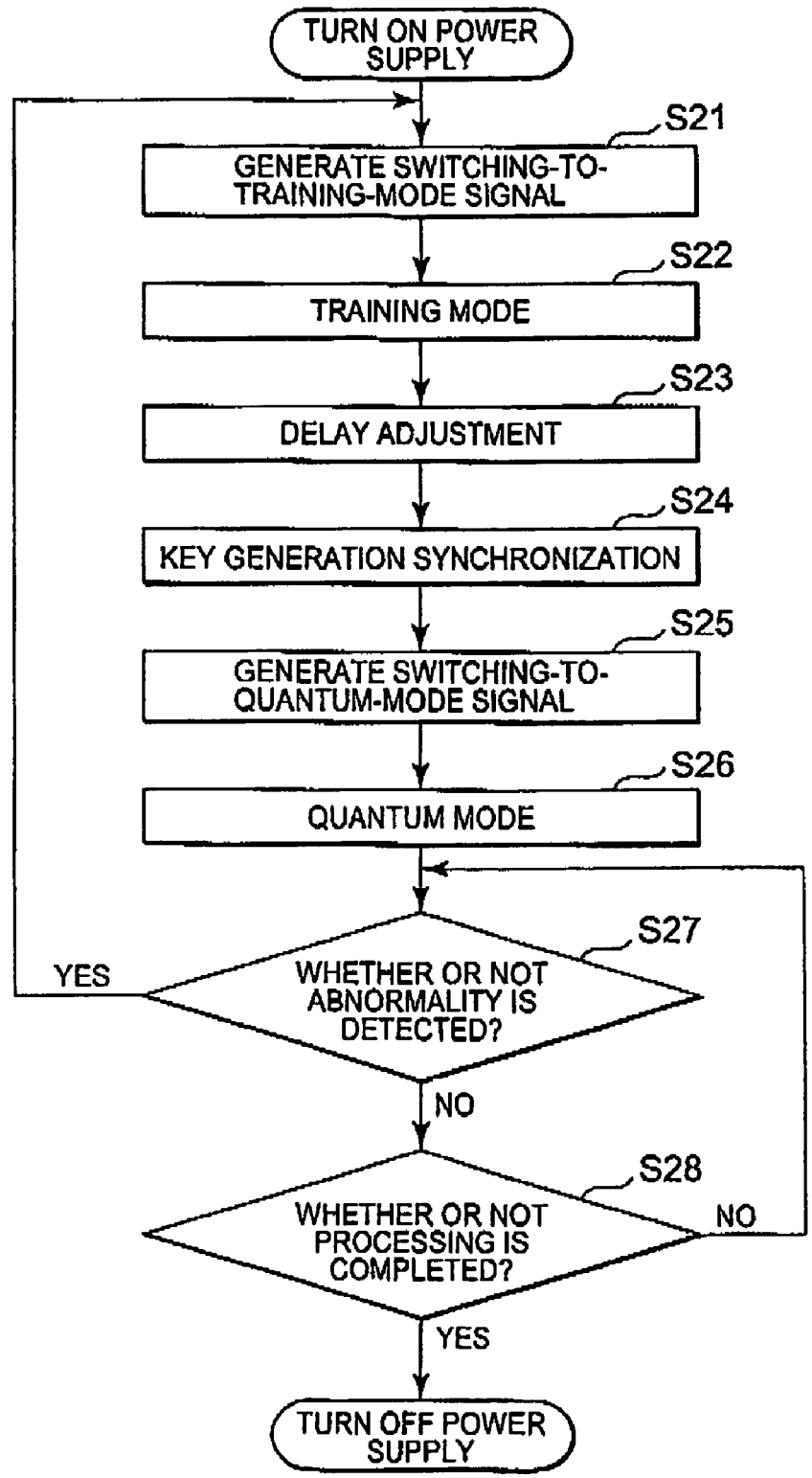
FIG. 10 is a flowchart showing mode-switching operations of a sender and a receiver in the quantum key distribution system according to the fourth example of the present invention.

FIG. 10 is a flowchart showing mode-switching operations on the sender side and the receiver side in the quantum key distribution system based on the "Plug & Play" scheme, according to the fourth example of the present invention. First, when the power supply is turned on, each of the communication controller 71 of the sender and the communication controller 72 of the receiver generates a switching-to-training-mode signal (Step S21). This signal causes each of the quantum unit 100 on the sender side and the quantum unit 200 on the receiver side to shift to the training mode (Step S22).

In the training mode, communication over the quantum channel 401 can be performed with strong light at approximately the same optical power level as used in normal communications. This strong light in the training mode can be obtained as follows. The optical power is increased by reducing the amounts of attenuation both in the optical attenuator 213 for attenuating an optical pulse of the laser on the receiver side and in the optical attenuator 130 for the quantum channel 401 on the sender side. Moreover, the mark ratio is made larger than that in the quantum mode by widening the pulse width of a driving current with which the laser-driving circuit 212 drives the laser 211. This is because, as described earlier, in the training mode, there is no need to distinguish between the optical pulses traveling through the different paths, the short path 404 and the long path 405, on the receiver side.

When the optical power over the quantum channel 401 is as strong as used in normal communications, it becomes possible to extract a clock signal from the quantum channel 401. In the quantum unit 100 on the sender side, the optical-to-electrical converter 140 converts an optical clock signal into an electrical clock signal and outputs this clock signal to the phase comparator 503. In the quantum unit 200 on the receiver side, the APD 242 detects an optical clock signal and outputs an electrical clock signal to the phase comparator 303.

Further, in the training mode, in the synchronization section 500 on the sender side, the selector 504 selects the output of the optical-to-electrical converter 501, and in the synchronization section 300 on the receiver side, the selector 307 selects the delay element 302. A clock signal generated by the master clock 305 is transmitted to the sender through the wavelength-λ2 classical channel by the electrical-to-optical converter 304. At the same time, the clock signal drives the laser-driving circuit 212 to cause the laser 211 to emit a wavelength-λ1 optical pulse.

In the sender side, the phase comparator 503 compares the phase of the clock signal extracted from the quantum channel 401 by the optical-to-electrical converter 140 with the phase of the clock signal extracted from the classical channel 402 by the optical-to-electrical converter 501. Then, the comparison result is fed back to the delay element 502 so that a phase difference found by this comparison becomes zero (delay adjustment: Step S23).

The clock signal extracted from the classical channel 402 by the optical-to-electrical converter 501 is outputted to the electrical-to-optical converter 505 via the selector 504. The clock signal is then returned to the receiver through the wavelength-λ3 classical channel 402. In addition, the optical signal arriving over the quantum channel 401 is reflected by the Faraday mirror 120 and returned as it is to the receiver through the quantum channel 401, without being phase-modulated by the phase modulator 111, nor being reduced in optical power by the optical attenuator 130.

On the other hand, in the quantum unit 200 on the receiver side, the APD 242 receives the optical pulse sent back over the quantum channel 401. This is because, since the phase modulator 111 in the quantum unit 100 on the sender side has not carried out the phase modulation, the modulation phase at the quantum unit 100 on the sender side matches the modulation phase at the quantum unit 200 on the receiver side, and therefore the output of the optical pulse to the APD 242 is uniquely given.

Meanwhile, the clock signal received by the optical-to-electrical converter 301 through the wavelength-λ3 classical channel 402 is outputted to the delay element 302 via the selector 307. The clock signal delayed in the delay element 302 is inputted into the phase comparator 303.

The phase comparator 303 compares the clock signal (synchronization signal) received by the APD 242 with the clock signal extracted from the classical channel 402 by the optical-to-electrical converter 301. Then, its comparison result is fed back to the delay element 302 so that a phase difference found by this comparison becomes zero (delay adjustment: Step S23).

(Key Creation Synchronization)

Once the phase differences become zero and the amounts of delay in the delay elements 502 and 302 are determined both in the synchronization section 500 on the sender side and in the synchronization section 300 on the receiver side, each of the communication controllers 71 and 72 shifts its operation mode to the key creation synchronization processing mode (Step S24).

Upon shifting to the key creation synchronization processing, the communication controller 71 of the sender switches the selectors 114 and 504 so that each will select a key creation reference signal. Moreover, the key creation reference generator 506 outputs a key creation reference signal in accordance with the timing of a calibration clock signal CLK. Thus, the key creation reference signal is inputted into the modulator-driving circuit 112. The phase modulator 111 operates in accordance with the timing of the calibration clock signal CLK, and phase-modulates the light reflected from the Faraday mirror 120 into a phase, 0 or π, in accordance with a value, 0 or 1, of the key creation criterion signal. The phase-modulated signal is then transmitted to the receiver. At the same time, the key creation reference signal is forwarded to the electrical-to-optical converter 505 via the selector 504 and then transmitted to the receiver through the wavelength-λ3 classical channel 402.

Upon shifting to the key creation synchronization processing, the communication controller 72 of the receiver switches the selector 307 to the key creation reference detector 306 so that the key creation reference signal received through the wavelength-λ3 classical channel is forwarded to the key creation reference detector 306. Moreover, the communication controller 72 instructs the key creation controller 620 to fix the phase of the phase modulator 221 at 0. With this setting, the phase modulator 221 modulates the phase of the optical signal that has been phase-modulated by the phase modulator 111 on the sender side, in accordance with the timing of the calibration clock signal CLK. The received optical signal is detected by the APD 241 when the value of the key creation reference signal is 0, but by the APD 242 when the value of the key creation reference signal is 1.

Figure 1:
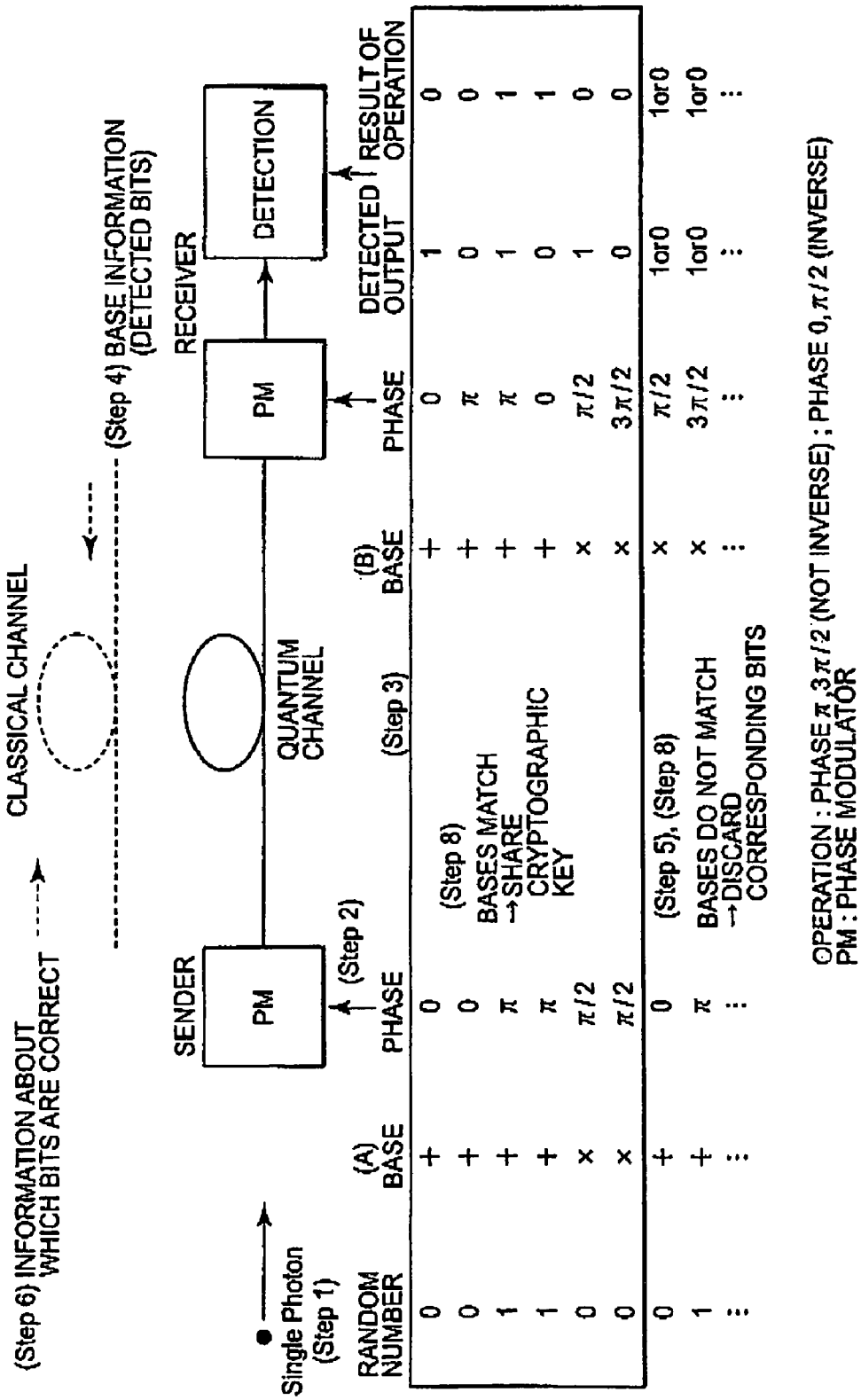
FIG. 1 is a schematic diagram for explaining Steps 1 to 8 of a key-sharing procedure according to BB84.

The key creation reference detector 306 compares the timing of detecting the key creation reference signal received through the classical channel 402 with the timing of detecting the key creation reference signal received by the APD 242 through the quantum channel 401, and notifies the result thereof to the key creation controller 620. Bit synchronization as described in conjunction with FIG. 1 can be established by compensating a difference between these detection timings. When the detection timing notification has been completed, the communication controller 72 generates a switching-to-quantum-mode signal to allow the key creation controller 620 to shift to the quantum mode. At the same time, the communication controller 72 sends a request for switching into the quantum mode, to the sender through the classical channel 403, thereby allowing also the key creation controller 610 on the sender side to shift to the quantum mode (Step S25).

Thus, through the delay adjustments (Step S23) and the key creation synchronization (Step S24), it is possible to establish the clock synchronization over the quantum channel and the bit synchronization for key creation.

(Quantum Mode)

The quantum mode is a mode in which the optical power over the quantum channel 401 is very weak, with one photon per bit. This weak light in the quantum mode can be obtained as follows. The optical power is weakened by increasing the amount of attenuation in the optical attenuator 130 for the quantum channel 401 on the sender side. Moreover, the mark ratio is lowered by narrowing the pulse width of a driving current with which the laser-driving circuit 212 on the receiver side drives the laser 211. This is because it is required to distinguish between the optical pulses traveling through the different paths, the short path 404 and the long path 405, on the receiver side. The quantum cryptographic key creation is carried out in this quantum mode.

During the quantum-mode operation, since the amounts of delay have been determined through the above-described delay adjustments, the quantum units 100 and 200 are in a state of synchronization on the basis of the master clock 305. That is, the phase modulator 111 in the quantum unit 100 on the sender side operates in synchronization with a clock signal calibrated by the synchronization section 500 on the sender side, and the phase modulator 221 and the APDs 241 and 242 in the quantum unit 200 on the receiver side operate in synchronization with a clock signal calibrated by the synchronization section 300 on the receiver side.

In the quantum mode, each of the communication controller 71 of the sender and the communication controller 72 of the receiver determines whether or not an abnormality (e.g., a lock abnormality in the DLL) occurs (Step S27). If the occurrence of an abnormality is detected (Step S27: YES), the process returns to Step S21 to generate a switching-to-training-mode signal again. When no abnormality is detected (Step S27: NO) and the completion of the processing is not detected either (Step S28: NO), the abnormality detection processing (Step S27) is repeated. On the other hand, when the processing is completed (Step S28: YES), the power supply is turned off.

As described hereinabove, in this fourth example, a propagation delay difference due to wavelength dispersion between the quantum channel 401 and the classical channel 402 can be automatically calibrated, independently of the transmission line. As a result, in this fourth example, synchronization between the quantum unit 100 on the sender side and the quantum unit 200 on the receiver side can be established by using the classical channel 402 at a different wavelength from that of the quantum channel 401, instead of using the quantum channel 401 from which a clock signal cannot be extracted because of the very weak light.

Conventionally, when communications were carried out using the quantum channel with light at a very low optical power level, the light hardly reached a receiver. Therefore, for example, even if a sender sent data with a mark ratio of 1/2, the mark ratio became far smaller than 1/2 at a receiver, and data losses occurred. Accordingly, it was impossible to extract an accurate-period clock signal. In contrast, in this fourth example, communications over the quantum channel 401 are carried out, as the training mode, with strong light at approximately the same optical power level as used in normal communications. Therefore, for example, if the sender sends data with a mark ratio of 1/2, the mark ratio on the receiver side also becomes 1/2, hence no data losses. Accordingly, it is possible to extract an accurate-period clock signal. By utilizing this, synchronization can be easily established between the quantum units on the sender side and the receiver side, even if there is a propagation delay difference between the quantum channel and the classical channel.

Further, according to this fourth example, once the synchronization is established between the quantum units, key creation reference signal is simultaneously sent, based on the established synchronization, from the sender to the receiver through both the quantum channel and the classical channel, and the timings of detecting the signals having traveled through the different channels are compared on the receiver side. Thus, key creation synchronization can be easily established with high precision.

2.2) FIFTH EXAMPLE

Figure 11:
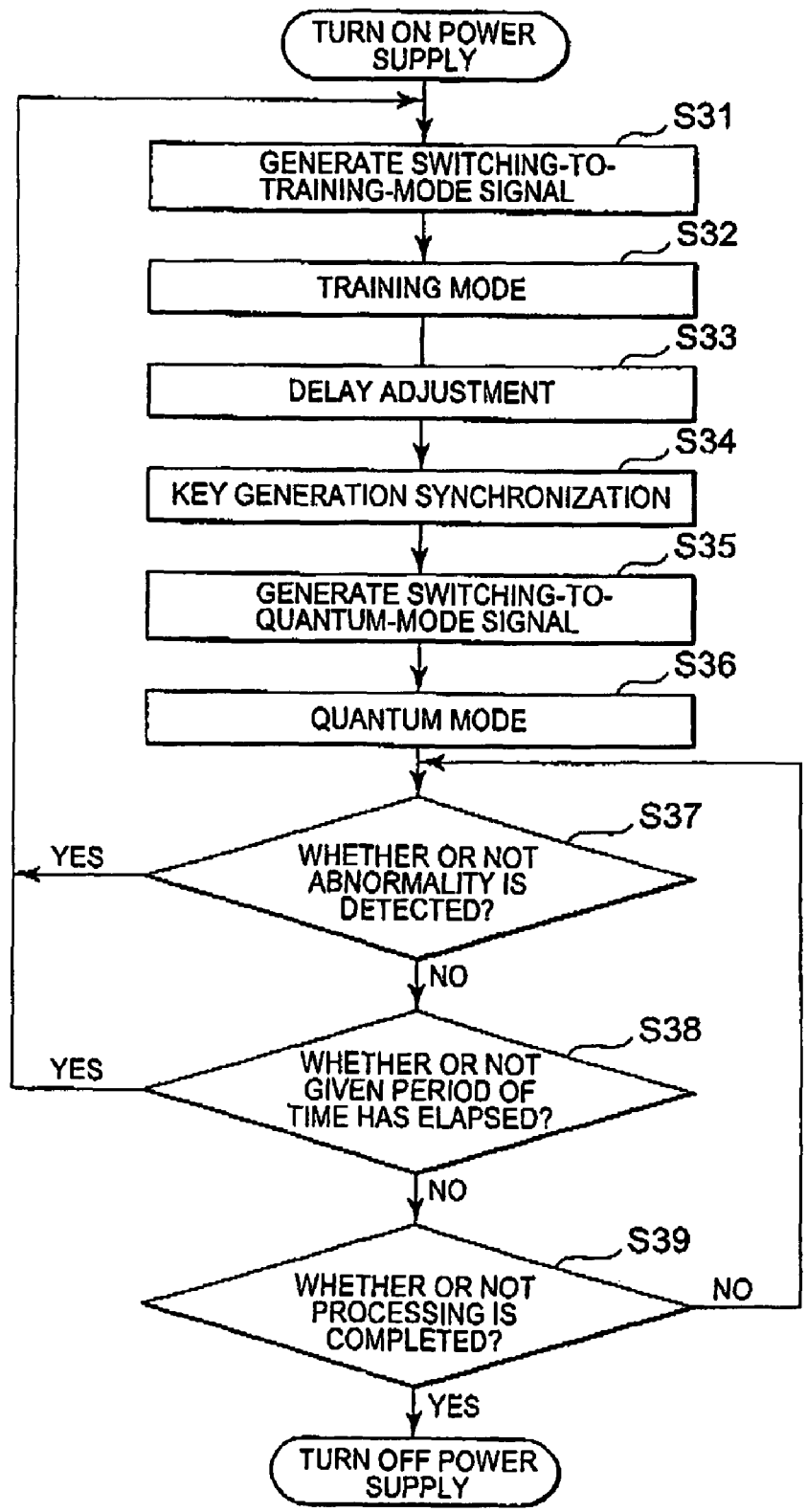
FIG. 11 is a flowchart showing mode-switching operations of a sender and a receiver, according to a fifth example of the present invention.

FIG. 11 is a flowchart showing mode-switching operations on the sender side and the receiver side according to a fifth example of the present invention. In the fifth example, the configurations of the devices are substantially the same as those of the fourth example shown in FIG. 9, and therefore a description will be given below only of the mode-switching operations on the sender side and the receiver side in the fifth example.

In FIG. 11, Steps S31 to S34 correspond to Steps S21 to S24 in FIG. 10 described in the fourth example. In Steps S31 to S34, the delay adjustments and the key creation synchronization processing in the training mode are executed, whereby the clock synchronization and the key creation synchronization are established between the quantum units 100 and 200. Upon shifting to the quantum mode through subsequent Steps S35 and S36, each of the communication controllers starts a timer set for a given period of time and also determines whether or not an abnormality, such as a lock abnormality in the DLL, occurs (Step S37). When the occurrence of an abnormality is detected (Step S37: YES), the process returns to Step S31 to generate a switching-to-training-mode signal again.

When no abnormality is detected (Step S37: NO), each of the communication controllers determines whether or not the given period of time has elapsed (Step S38). When the elapse of the given period of time is not detected (Step S38: NO) and the completion of the processing is not detected either (Step S39: NO), the abnormality detection processing (Step S37) is repeated. When an abnormality is detected (Step S37: YES) or the given period of time has elapsed (Step S38: YES), the process returns to Step S31 to shift to the training mode. Additionally, when the completion of the processing is detected (Step S39: YES), the power supply is turned off.

As described above, in this fifth example, as in the aforementioned fourth example, a propagation delay difference due to wavelength dispersion between the quantum channel 401 and the classical channel 402 can be automatically calibrated, independently of the transmission line. As a result, synchronization between the quantum unit 100 on the sender side and the quantum unit 200 on the receiver side can be established by using the classical channel 402 at a different wavelength from that of the quantum channel 401, instead of using the quantum channel 401 from which a clock signal cannot be extracted because of the very weak light.

Moreover, according to this fifth example, once the synchronization is established between the quantum units, key creation reference signals are simultaneously transmitted, based on the established synchronization, from the sender to the receiver through both the quantum channel and the classical channel, and the timings of detecting the signals having traveled through the different channels are compared with each other on the receiver side. Thus, key creation synchronization can be easily established with high precision.

Furthermore, in this fifth example, the elapse of a given period of time is monitored in Step S38. When the given period of time has elapsed, the mode is switched to the training mode again, where the synchronization between the quantum units, as well as the key creation synchronization, is adjusted. Accordingly, by properly setting the given period of time, regular calibration can be carried out every given period of time. As a result, a further reliable quantum key distribution system can be achieved.

2.3) SIXTH EXAMPLE

In a communication system according to a sixth example of the present invention, as in the communication system shown in FIG. 7 for example, clock synchronization is provided using another optical fiber 5*b* in the same cable. The other internal configurations of a sender and a receiver are substantially the same as those shown in the block diagram of FIG. 8.

The communication system shown in FIG. 8 is a WDM (Wavelength Division Multiplexing) system using the optical fiber 5. In the WDM system, however, losses may occur due to an optical component for division/multiplexing when an optical signal is divided or multiplexed. In this sixth example, in order to prevent such losses, clock synchronization is provided using the other optical fiber 5*b* in the same cable. In this case, since the optical fibers are accommodated in the same cable, the physical lengths of the optical fibers are substantially the same. However, because of manufactural variations, a plurality of optical fibers in the same cable do not always have the same length of optical transmission line.

That is, in this sixth example, a quantum signal and a synchronization signal are not propagated over the same transmission line, and therefore, strictly speaking, the lengths of the transmission lines are not equal to each other. Accordingly, a propagation delay difference may occur between the quantum signal and the synchronization signal. Moreover, in this sixth example, since the other optical fiber 5*b* is used, the same wavelength can be employed for the quantum signal and the synchronization signal. However, if different wavelengths are employed, a propagation delay difference due to wavelength dispersion may also occur between the quantum signal and the synchronization signal. Nonetheless, these propagation delay differences can be calibrated by the delay adjustments at the synchronization sections 3 and 4 as described already. The specific training-mode operation, delay adjustment and key creation synchronization adjustment are the same as those described in the fourth example, and therefore a description thereof will be omitted.

Note that the present invention can apply not only to two-way communication system such as the "Plug & Play" system used in the above-described fourth to sixth examples, but also to one-way quantum communication. The technique of the present invention is effective, irrespective of the form of quantum communication. Moreover, the master clock 34 may be provided to the sender-side synchronization section 4, not to the receiver-side synchronization section 3. Furthermore, the connection between a sender and a receiver is not necessarily 1:1 connection, but may be 1:N connection (N is an integer not less than two).

The invention claimed is:

1. A communication system comprising first and second communication devices, which are connected to each other through at least one transmission line including first and second channels through which a signal in a state where optical power is relatively small and a signal in a normal state where optical power is relatively large are transmitted, the communication system further comprising:
   a reference signal generator for generating a reference signal to be transmitted through the second channel;
   a communicating section for transmitting the reference signal from the first communication device to the second communication device through the first channel, in the normal state where the optical power is relatively large;
   a phase comparator for comparing a phase of the reference signal detected from the first channel with a phase of the reference signal detected from the second channel, in each of the first and second communication devices; and
   a synchronization establishing section for establishing synchronization between the first and second communication devices, based on a result of comparison made by the phase comparator.

2. The communication system according to claim 1, wherein the reference signal is a clock signal, wherein the synchronization establishing section establishes the synchronization by timing adjustment such that a clock signal detected from the first channel is in phase with a clock signal detected from the second channel.

3. The communication system according to claim 1, wherein the reference signal is a shared-information creation reference signal which is used to create information to be shared between the first and second communication devices, wherein the synchronization establishing section establishes the synchronization by timing adjustment such that a shared-information creation reference signal detected from the first channel is in phase with a shared-information creation reference signal detected from the second channel.

4. The communication system according to claim 1, further comprising:
   a communication controller controlling the communicating section such that the communicating section is set to a communication mode of the normal state where optical power is relatively large during synchronization establishment operation and, after the synchronization has been established, the communicating section switches into a communication mode of the state where optical power is relatively small.

5. A communication device which is connected to another communication device through at least one transmission line including first and second channels through which a signal in a state where optical power is relatively small and a signal in a normal state where optical power is relatively large are transmitted, comprising:
   a first communicating section for communicating a reference signal with the other communication device through the first channel in the normal state where optical power is relatively large;
   a second communicating section for communicating the reference signal with the other communication device through the second channel;
   a phase comparator for comparing a phase of the reference signal detected from the first channel with a phase of the reference signal detected from the second channel; and
   a synchronization establishing section for establishing synchronization with the other communication device based on a result of comparison made by the phase comparator.

6. The communication device according to claim 5, wherein the reference signal is a clock signal, wherein the synchronization establishing section establishes the synchronization by timing adjustment such that a clock signal detected from the first channel is in phase with a clock signal detected from the second channel.

7. The communication device according to claim 5, wherein the reference signal is a shared-information creation reference signal which is used to create information to be shared with the other communication device, wherein the synchronization establishing section establishes the synchronization by timing adjustment such that a shared-information creation reference signal detected from the first channel is in phase with a shared-information creation reference signal detected from the second channel.

8. The communication device according to claim 5, further comprising:
   a communication controller controlling the first communicating section such that the first communicating section is set to a communication mode of the normal state where optical power is relatively large during synchronization establishment operation and, after the synchronization has been established, the first communicating section switches into a communication mode of the state where optical power is relatively small.

9. A method for establishing synchronization between first and second communication devices which are connected to each other through at least one transmission line including first and second channels through which a signal in a state where optical power is relatively small and a signal in a normal state where optical power is relatively large are transmitted, comprising:
   setting the first and second communication devices at a training mode;
   transmitting a clock signal from the first communication device to the second communication device through each of the first and second channels, the clock signal being in the normal state where optical power is relatively large;
   comparing a phase of a first clock signal detected from the first channel with a phase of a second clock signal detected from the second channel; and
   generating a calibration clock signal by making the first and second clock signals in phase with each other, wherein the calibration clock signal provides synchronization between the first and second communication devices.

10. The method according to claim 9, further comprising:
    transmitting a shared-information creation reference signal in accordance with the calibration clock signal from the first communication device to the second communication device through each of the first and second channels in the normal state where optical power is relatively large, wherein the shared-information creation reference signal is used to create information to be shared between the first and second communication devices;

comparing a phase of a first shared-information creation reference signal detected from the first channel with a phase of a second shared-information creation reference signal detected from the second channel; and establishing synchronization for creating the information to be shared between the first and second communication devices, based on a phase difference between the first shared-information creation reference signal and the second shared-information creation reference signal.

11. A communication system comprising a sender including a sender-side quantum unit and a receiver including a receiver-side quantum unit, wherein the sender and the receiver are connected to each other through at least one transmission line including a quantum channel and a classical channel, wherein the quantum channel is a communication channel through which a signal is transmitted from the sender-side quantum unit to the receiver-side quantum unit in a state where its optical power is relatively weak, wherein the classical channel is a communication channel through which a signal is transmitted between the sender and the receiver in a normal state where its optical power is relatively strong, comprising:

an instruction section for instructing each of the sender-side quantum unit and the receiver-side quantum unit to be set to a training mode in which a signal is transmitted in the normal state where its optical power is relatively strong, wherein the sender-side quantum unit comprises a communicating section allowing communication in the training mode, wherein each of the sender and the receiver comprises a synchronization establishment section for establishing synchronization between the sender-side quantum unit and the receiver-side quantum unit by comparing a phase of signal detected from the quantum channel with a phase of a clock signal detected from the classical channel in the training mode.

12. The communication system according to claim 11, wherein the synchronization establishment section calibrates a propagation delay difference due to wavelength dispersion between the quantum channel and the classical channel based on a result of the phase comparison.

13. The communication system according to claim 11, wherein clock synchronization is performed by using a synchronization signal at another wavelength used in the classical channel, which is different from a wavelength used in the quantum channel, during a key creation operation performed between the sender-side quantum unit and the receiver-side quantum unit.

14. The communication system according to claim 11, wherein a pulse width of an optical pulse on the quantum channel is widened in the training mode.

15. The communication system according to claim 11, further comprising:

a key creation synchronization section for establishing key-creation synchronization between the sender-side quantum unit and the receiver-side quantum unit after clock synchronization has been completed.

16. The communication system according to claim 15, wherein the key creation synchronization section comprises:

a transmitter for transmitting a key-creation reference signal from the sender-side quantum unit to the receiver-side quantum unit through both the quantum channel and the classical channel;

a phase-difference detector for detecting a phase difference between a key-creation reference signal detected from the quantum channel and a key-creation reference signal detected from the classical channel; and a key-creation controller for establishing the key-creation synchronization by compensating the detected phase difference.

17. The communication system according to claim 11, wherein the state where optical power is relatively weak is at most one photon per bit.

18. The communication system according to claim 11, wherein the quantum channel and the classical channel are included in different optical fibers.

19. A method for establishing synchronization between a sender-side quantum unit included in a sender and a receiver-side quantum unit included in a receiver in a quantum key distribution system, wherein the sender and the receiver are connected to each other through at least one transmission line including a quantum channel and a classical channel, wherein the quantum channel is a communication channel through which a signal is transmitted from the sender-side quantum unit to the receiver-side quantum unit in a state where its optical power is relatively weak, wherein the classical channel is a communication channel through which a signal is transmitted between the sender and the receiver in a normal state where its optical power is relatively strong, comprising:

instructing each of the sender-side quantum unit and the receiver-side quantum unit to be set to a training mode in which a signal is transmitted in the normal state where its optical power is relatively strong;

at the sender side, performing communication in the training mode; and at the receiver side, establishing synchronization between the sender-side quantum unit and the receiver-side quantum unit by comparing a phase of a clock signal detected from the quantum channel with a phase of a clock signal detected from the classical channel in the training mode.

20. The method according to claim 19, wherein, when establishing the synchronization, a propagation delay difference due to wavelength dispersion between the quantum channel and the classical channel is calibrated based on a result of the phase comparison.

21. The method according to claim 19, wherein clock synchronization is performed by using a synchronization signal at another wavelength used in the classical channel, which is different from a wavelength used in the quantum channel, during a key creation operation performed between the sender-side quantum unit and the receiver-side quantum unit.

22. The method according to claim 19, wherein a pulse width of an optical pulse on the quantum channel is widened in the training mode.

23. The method according to claim 19, further comprising:

establishing key-creation synchronization between the sender-side quantum unit and the receiver-side quantum unit after clock synchronization has been completed.

24. The method according to claim 23, wherein the key creation synchronization is performed by:

transmitting a key-creation reference signal from the sender-side quantum unit to the receiver-side quantum unit through both the quantum channel and the classical channel;

detecting a phase difference between a key-creation reference signal detected from the quantum channel and a key-creation reference signal detected from the classical channel; and compensating the detected phase difference.

25. The method according to claim 19, wherein the synchronization between the sender-side quantum unit and the receiver-side quantum unit is established in the training mode when power supply is turned on at the sender and the receiver.

26. The method according to claim 19, wherein the synchronization between the sender-side quantum unit and the receiver-side quantum unit is established in the training mode when an abnormality is detected at the sender and the receiver.

27. The method according to claim 19, wherein the synchronization between the sender-side quantum unit and the receiver-side quantum unit is established in the training mode every predetermined period of time.

* * * * *

UNITED STATES PATENT AND TRADEMARK OFFICE
CERTIFICATE OF CORRECTION

PATENT NO. : 7,783,042 B2
APPLICATION NO. : 11/056183
DATED : August 24, 2010
INVENTOR(S) : Wakako Maeda et al.

Page 1 of 1

It is certified that error appears in the above-identified patent and that said Letters Patent is hereby corrected as shown below:

Column 9, Line 3: Delete "Configuration" and insert -- (Configuration) --

Column 9, Line 54: Delete "beat" and insert -- beam --

Column 12, Line 49: Delete "(step S6)." and insert -- (Step S6). --

Column 12, Line 53: Delete "S1:" and insert -- S7: --

Column 13, Line 39: Delete "316:" and insert -- S16: --

Column 13, Line 50: Delete "(step" and insert -- (Step --

Column 17, Line 3-4: Delete "creation wavelength" and insert -- creation. Wavelength --

Column 27, Line 35: In Claim 11, delete "signal" and insert -- a clock signal --

Signed and Sealed this
Eighth Day of February, 2011

David J. Kappos
*Director of the United States Patent and Trademark Office*